(12) United States Patent
Okudera

(10) Patent No.: US 7,218,720 B2
(45) Date of Patent: May 15, 2007

(54) TELEPHONE DIRECTORY ASSISTANCE METHOD AND TELEPHONE DIRECTORY ASSISTANCE SYSTEM

(75) Inventor: Yoichi Okudera, Tokyo (JP)

(73) Assignee: Norihiro Koizumi, Shizuoka (JP)

( * ) Notice: Subject to any disclaimer, the term of this patent is extended or adjusted under 35 U.S.C. 154(b) by 334 days.

(21) Appl. No.: 10/415,439

(22) PCT Filed: Oct. 30, 2001

(86) PCT No.: PCT/JP01/09517

§ 371 (c)(1),
(2), (4) Date: Feb. 4, 2004

(87) PCT Pub. No.: WO02/37814

PCT Pub. Date: May 10, 2002

(65) Prior Publication Data

US 2005/0259805 A1    Nov. 24, 2005

(30) Foreign Application Priority Data

Oct. 30, 2000   (JP) ............................. 2000-329940

(51) Int. Cl.
*H04M 3/42* (2006.01)
*H04M 1/64* (2006.01)
(52) U.S. Cl. ................ 379/218.01; 379/88.21
(58) Field of Classification Search ........... 379/218.01, 379/218.02, 211.01, 201.01, 201.02, 88.16, 379/88.18, 88.19, 88.2, 88.21
See application file for complete search history.

(56) References Cited

U.S. PATENT DOCUMENTS 5,613,006 A * 3/1997 Reese ..................... 379/67.1

6,970,548 B2 * 11/2005 Pines et al. ............. 379/218.01

FOREIGN PATENT DOCUMENTS

| | | |
|---|---|---|
| JP | 09-271052 A1 | 10/1997 |
| JP | 10-091512 A | 4/1998 |
| JP | 10-290259 A1 | 10/1998 |
| JP | 11-074931 A | 3/1999 |
| JP | 11-163924 A | 6/1999 |
| JP | 11-341156 A1 | 12/1999 |
| JP | 2000-200227 A | 7/2000 |
| JP | 2000-285136 A | 10/2000 |
| JP | 2001-005833 A | 1/2001 |
| JP | 2001-067323 A | 3/2001 |

OTHER PUBLICATIONS

United Kingdom Search and Examination Report for GB0312470.8 (Dated Apr. 15, 2004).

* cited by examiner

*Primary Examiner*—Benny Quoc Tieu
(74) *Attorney, Agent, or Firm*—Rader, Fishman & Grauer PLLC

(57) ABSTRACT

This telephone directory assistance system accepts a request for a telephone number of a registrant, and judges whether the registrant is registered in a telephone number data base. When the registrant is registered in the telephone number data base, the telephone directory assistance system judges whether a message from the inquirer is transmitted to the registrant without informing the telephone number to the inquirer based on a telephone number disclosing condition registered in the telephone number data base. Then, in a case of transmission, the inquirer is caused to input a message and the inputted message is informed to the registrant.

20 Claims, 39 Drawing Sheets

◆ REGISTRATION OF CHANGER BASIC INFORMATION ◆

◆ REGISTRATION OF CHANGER BASIC INFORMATION
(FOR INDIVIDUAL)

NAME OF CHANGER
FAMILY NAME | GIVEN NAME
BROWN | TOM
← 60

ADDRESS OF CHANGER
NUMBER | STREET | CITY | STATE | ZIP CODE
111 | SOUTH FIGUEROA STREET | LOS ANGELES | CALIFORNIA | 90017
← 61

TELEPHONE NUMBER | FAX NUMBER
212 | XXXX | XXXX | 212 | XXXX | ZZZZ ← 63

ACQUISITION OF E-MAIL ACCOUNT    IF THIS BUTTON CLICKED, AN E-MAIL ADDRESS IS GIVEN AUTOMATICALLY FROM INQUIRY CENTER AND DISPLAYED BELOW.
← 62

E-MAIL ADDRESS
after-change@new-isp.com

HOME PAGE URL

DESIRED PASSWORD
tom01234
← 20

FIG. 13

- REGISTRATION OF INQUIRER WHOSE INQUIRY CHANGER WANTS TO REFUSE IN INQUIRY REFUSAL LIST
  - ◆ REGISTRATION OF INQUIRER WHOSE INQUIRY CHANGER WANTS TO REFUSE IN INQUIRY REFUSAL LIST ◆

18

| No. | E-MAIL ADDRESS FROM WHICH INQUIRY IS REFUSED | DATE OF REGISTRATION IN LIST | REASON OF REGISTRATION | | | | | |
|---|---|---|---|---|---|---|---|---|
| 01 | sophist@xxxx.com | 2000.09.01 | INITIAL REGISTRATION BY CHANGER | | | | | |
| 02 | sales@zzz.com | 2000.09.01 | INITIAL REGISTRATION BY CHANGER | | | | | |
| 03 | directmail@***.com | 2000.09.01 | INITIAL REGISTRATION BY CHANGER | | | | | |
| | | | | | | | | |
| | | | | | | | | |
| | | | | | | | | |

69

REGISTRATION

DELETION

FIG. 16

◆ NOTICE OF COMPLETION OF CHANGER REGISTRATION ◆

◆ NOTICE OF COMPLETION OF CHANGER REGISTRATION ◆

● CHANGER REGISTRATION WITH FOLLOWING CONTENTS IS COMPLETED

NAME: TOM BROWN
    ADDRESS: 111 SOUTH FIGUEROA STREET, LOS ANGELES, CALIFORNIA 90017
    TELEPHONE NUMBER: 212-XXXX-XXXX
    FAX NUMBER: 212-XXXX-ZZZZ
    E-MAIL ADDRESS: < after-change@new-1sp.com >
    SETTING CONTENTS: REGISTERED ADDRESS - OLD E-MAIL ADDRESS < before-change@old-1sp.com >
                          - NEW E-MAIL ADDRESS < after-change@new-1sp.com >
                 RESPONSE IN OCCURRENCE OF INQUIRY - MAKE CHANGER JUDGE WHETHER TO DISCLOSE
                                              ADDRESS TO INQUIRER AFTER ACQUISITION OF
                                              INQUIRY INFORMATION INFORMATION TO BE DISCLOSED - NEW E-MAIL ADDRESS < after-change@new-1sp.com >
                 SETTING OF NOTICE OF INQUIRY - EXCLUDE MESSAGE TEXT FROM INQUIRY INFORMATION
                 SETTING OF ADVANCE INQUIRY REFUSAL LIST - < sophist@xxx.com >
                                           - < sales@zzz.com >
                                           - < directmail@***.com >

CHANGER ID: ......
    PASSWORD: tom01234

● PLEASE CONFIRM THAT THE ABOVE REGISTRATION CONTENTS AND CHANGER ID ARE SENT TO YOUR REGISTERED E-MAIL ADDRESS.

● IN CASE OF AMENDING REGISTRATION/SETTING CONTENTS, LOG IN CHANGER MENU ON HOME PAGE OF INQUIRY CENTER WITH CHANGER ID AND PASSWORD AND AMEND THEM.

FIG. 17

REGISTRATION OF INQUIRER BASIC INFORMATION ◆

◆ REGISTRATION OF INQUIRER BASIC INFORMATION
(FOR INDIVIDUAL)

NAME OF INQUIRER
FAMILY NAME    GIVEN NAME
[FORD]         [BILL]
   ↑
   70

ADDRESS OF INQUIRER
NUMBER  STREET          CITY     STATE          ZIP CODE
[222]   [SUMMER STREET] [BOSTON] [MASSACHUSETTS] [02110]
   ↑
   71

TELEPHONE NUMBER              FAX NUMBER
[017] [XXXX] [XXXX]            [017] [XXXX] [ZZZZ]
   ↑                                            ↑
   72                                           73

[ACQUISITION OF E-MAIL ACCOUNT]  IF THIS BUTTON CLICKED, AN E-MAIL ADDRESS IS
                                 GIVEN AUTOMATICALLY FROM INQUIRY CENTER AND
                                 DISPLAYED BELOW.

E-MAIL ADDRESS                HOME PAGE URL
[·····@aa.center.com]         [                    ]

DESIRED PASSWORD
[bill56789]
   ↑
   39

FIG. 19

◆ NOTICE OF COMPLETION OF INQUIRER REGISTRATION ◆

● NOTICE OF COMPLETION OF INQUIRER REGISTRATION ◆

● INQUIRER REGISTRATION WITH FOLLOWING CONTENTS IS COMPLETED.

NAME: BILL FORD
    ADDRESS: 222 SUMMER STREET, BOSTON, MASSACHUSETTS 02210
  TELEPHONE NUMBER: 017-XXXX-XXX
    FAX NUMBER: 017-XXXX-ZZZZ
  E-MAIL ADDRESS: < ······@aa.center.com > (E-MAIL ACCOUNT USABLE FOR INQURY CENTER ONLY)
    ACCOUNT NAME: ······
    ACCOUNT ID: ······
    POP SERVER: aa.center.com INQUIRER ID: ······
    PASSWORD: bill56789

● PLEASE CONFIRM THAT THE ABOVE REGISTRATION CONTENTS AND CHANGER ID ARE SENT TO YOUR REGISTERED E-MAIL ADDRESS.

● IN CASE OF AMENDING REGISTRATION/SETTING CONTENTS, LOG IN CHANGER MENU ON HOME PAGE OF INQUIRY CENTER WITH CHANGER ID AND PASSWORD AND AMEND THEM.

FIG. 22

◆ NOTICE OF SEARCH RESULT OF INQUIRY ABOUT CHANGE INFORMATION ◆

◆ NOTICE OF SEARCH RESULT OF INQUIRY ABOUT CHANGE INFORMATION ◆

DEAR MR. BILL FORD, (INQUIRER ID: inq0001     )
● DATE AND TIME OF INQUIRY: 2000/09/01  20:30  (INQUIRY NO.XXX000)
● E-MAIL ADDRESS INQUIRED THIS TIME: < before-change@old-isp.com >

! SORRY THAT E-MAIL ADDRESS INQUIRED BY YOU IS NOT REGISTERED IN CHANGE INFORMATION IN INQUIRY CENTER.

INQUIRY ABOUT E-MAIL ADDRESS COMES TO AN END.

CHANGER MAY REGISTER CHANGE INFORMATION AT INQUIRY CENTER HEREAFTER IF THIS E-MAIL ADDRESS HAS RECENTLY BEEN CHANGED. WE RECOMMEND YOU TO MAKE INQUIRY AGAIN AFTER A WHILE.

[RETURN TO TOP PAGE]

FIG. 26

| SENDER: ADDRESS INQUIRY CENTER | DESTINATION: TOM BROWN |
|---|---|
| < info@center.com > | < after-change@new-isp.com > |

SUBJECT: WE SEND YOU MESSAGE FROM INQUIRER

◆ SUBJECT: WE SEND YOU MESSAGE FROM INQUIRER ◆

DEAR MR. TOM BROWN, (CHANGER ID: chg0001)
WE SEND YOU MESSAGE YOU INSTRUCTED US TO ACQUIRE IN YOUR INQUIRY.
WE SEND YOU MESSAGE FROM INQUIRER.

● DATE AND TIME OF INQUIRY: 2000/09/01 20:30  (INQUIRY NO.XXX000)
● E-MAIL ADDRESS OF INQUIRER: < Inq0001@aa.center.com >
● MEMO OR PROFILE CHARACTERIZING INQUIRER: I AM BILL FORD, YOUR CLASSMATE FROM JUNIOR HIGH
● SUBJECT: INVITATION TO CLASS REUNION PARTY.
● MESSAGE TEXT: DEAR MR. TOM BROWN,
   TWENTY YEARS HAVE PASSED ALREADY SINCE WE GRADUATED FROM JUNIOR HIGH.
   I HOPE THAT...

! MAKE RESPONSE TO THIS INQUIRER THROUGH E-MAIL OF "CONFIRMATION FORM" OR CHANGER MENU ON
  HOME PAGE OF INQUIRY CENTER.

! IF YOU DO NOT RESPOND TO INQUIRER BY 20:30 IN 2000/09/XX,
  THIS INQUIRY BECOMES INVALID. PLEASE PAY ATTENTION TO THIS.

( ACCESS TO CHANGER MENU ON HOME PAGE OF INQUIRY CENTER )

FIG. 31

◆ NOTICE OF RESULT OF INQUIRY ABOUT E-MAIL ADDRESS ◆

◆ NOTICE OF RESULT OF INQUIRY ABOUT E-MAIL ADDRESS ◆

DEAR MR. BILL FORD (INQUIRER ID: inq0001    )
● DATE AND TIME OF INQUIRY: 2000/09/01 20:30 (INQUIRY NO.XXX000)
● E-MAIL ADDRESS INQUIRED THIS TIME: < before-change@old-1sp.com >

! SORRY THAT CHANGER WHOSE NEW ADDRESS IS INQUIRED BY YOU REFUSES
  RECEIPT OF INQUIRY ABOUT NEW ADDRESS.

UNLESS THIS CHANGER CHANGES SETTING IN RECEIVING INQUIRY ABOUT NEW ADDRESS,
YOU CAN NOT INQUIRE OF THIS CHANGER ABOUT NEW ADDRESS.

INQUIRY ABOUT E-MAIL ADDRESS COMES TO AN END.
WE HOPE YOU WILL NOT TAKE IT AMISS.

[RETURN TO TOP PAGE]

FIG. 32

◆ NOTICE OF RESULT OF INQUIRY ABOUT E-MAIL ADDRESS ◆

◆ NOTICE OF RESULT OF INQUIRY ABOUT E-MAIL ADDRESS ◆

DEAR MR. BILL FORD, (INQUIRER ID: inq0001    )
● DATE AND TIME OF INQUIRY: 2000/09/01 20:30 (INQUIRY NO.XXX000)
● E-MAIL ADDRESS INQUIRED THIS TIME: < before-change@old-1sp.com >

! CHANGER WHOSE NEW ADDRESS IS INQUIRED BY YOU HAS DISCLOSED NEW E-MAIL ADDRESS.
  NEW E-MAIL ADDRESS IS AS FOLLOWS.

< after-change@new-1sp.com >  ⤶ 24

INQUIRY ABOUT E-MAIL ADDRESS COMES TO AN END.

[RETURN TO TOP PAGE]

FIG. 33

SENDER: ADDRESS INQUIRY CENTER
< info@center.com >

DESTINATION: BILL FORD
< 1nq0001@aa.center.com >

SUBJECT: NOTICE OF CHANGER'S RESPONSE TO YOUR INQUIRY

◆ NOTICE OF CHANGER'S RESPONSE TO YOUR INQUIRY ◆
DEAR MR. BILL FORD ( INQUIRER ID: 1nq0001     )

● DATE AND TIME OF INQUIRY: 2000/09/01 20:30  (INQUIRY NO.XXX000)
● E-MAIL ADDRESS OF INQUIRER THIS TIME: < before-change@old-isp.com >

! TO YOUR INQUIRY ABOUT E-MAIL ADDRESS, CHANGER DID NOT DISCLOSE NEW E-MAIL ADDRESS THIS TIME.
  BUT YOU CAN MAKE INQUIRY ABOUT THIS CHANGER AGAIN BECAUSE CHANGER INSTRUCTS INQUIRY
  CENTER TO RECEIVE INQUIRY ABOUT E-MAIL ADDRESS FROM YOU HEREAFTER.

! THERE IS A POSSIBILITY THAT CHANGER COULD NOT SPECIFY YOU WITH CONTENTS OF
  "SUBJECT" AND "MEMO OR PROFILE CHARACTERIZING INQUIRER" OF THIS INQUIRY E-MAIL.
  WE RECOMMEND YOU TO MAKE INQUIRY NEXT TIME WITH EASIER CONTENTS.

FIG. 35

```
SENDER: ADDRESS INQUIRY CENTER          DESTINATION: BILL FORD
        < info@center.com >                          < inq0001@aa.center.com >

SUBJECT: NOTICE OF CHANGER'S RESPONSE TO YOUR INQUIRY

◆ NOTICE OF CHANGER'S RESPONSE TO YOUR INQUIRY ◆
DEAR MR. BILL FORD ( INQUIRER ID: inq0001   )

● DATE AND TIME OF INQUIRY: 2000/09/01  20:30   (INQUIRY NO.XXX000)
● E-MAIL ADDRESS INQUIRED THIS TIME: < before-change@old-isp.com >
● DEADLINE FOR RESPONSE: 2000/09/XX  20:30

! SORRY THAT CHANGER DID NOT RESPOND TO YOUR INQUIRY ABOUT E-MAIL ADDRESS BEFORE DEADLINE.

! PRESENT INQUIRY ABOUT E-MAIL ADDRESS COMES TO AN END, BUT WE RECOMMEND YOU TO
  INQUIRE OF THIS CHANGER ABOUT THE ADDRESS AGAIN AFTER A WHILE.
```

FIG. 36

```
┌─────────────────────────────────┬──────────────────────────────────────────┐
│ SENDER: ADDRESS INQUIRY CENTER  │ DESTINATION: BILL FORD                   │
│         <.info@center.com>      │              < inq0001@aa.center.com >   │
├─────────────────────────────────┴──────────────────────────────────────────┤
│ SUBJECT: NOTICE OF CHANGER'S RESPONSE TO YOUR INQUIRY                      │
├────────────────────────────────────────────────────────────────────────────┤
│ ◆ NOTICE OF CHANGER'S RESPONSE TO YOUR INQUIRY ◆                           │
│ DEAR MR. BILL FORD ( INQUIRER ID: Inq0001  )                               │
│                                                                            │
│  ● DATE AND TIME OF INQUIRY: 2000/09/01  20:30   (INQUIRY NO.XXX000)       │
│  ● E-MAIL ADDRESS INQUIRED THIS TIME: < before-change@old-isp.com >        │
│                                                                            │
│  TO YOUR INQUIRY ABOUT E-MAIL ADDRESS, CHANGER DID NOT DISCLOSE NEW        │
│  E-MAIL ADDRESS THIS TIME. YOU CAN NOT MAKE INQUIRY ABOUT THIS CHANGER     │
│  AGAIN BECAUSE THIS CHANGER INSTRUCTS INQUIRY CENTER TO REFUSE RECEIPT     │
│  OF YOUR INQUIRY ABOUT E-MAIL ADDRESS.                                     │
│                                                                            │
│  INQUIRY ABOUT E-MAIL ADDRESS COMES TO AN END.                             │
│  WE HOPE YOU WILL NOT TAKE IT AMISS.                                       │
└────────────────────────────────────────────────────────────────────────────┘
```

FIG. 38

TELEPHONE DIRECTORY ASSISTANCE METHOD AND TELEPHONE DIRECTORY ASSISTANCE SYSTEM

TECHNICAL FIELD

The present invention relates to a telephone directory assistance method and telephone directory assistance system that are applicable to, for example, a telephone directory assistance service that informs a telephone number by telling an operator of an address, a name, etc., or service that informs a new telephone number using an old telephone number as a clue.

BACKGROUND ART

In the telephone directory assistance service of this kind, a person, who owns his/her telephone number (registrant), can select disclosure or private. For example, when a certain registrant does not want to make his/her telephone number known to others, the registrant registers his/her telephone number as private and this prevents the telephone number from being known by others via the telephone directory assistance service, so that the registrant's privacy is protected.

DISCLOSURE OF INVENTION

However, in such service, there is such a disadvantage that the registrant cannot make his/her telephone number known to even a person whom he/she wants to inform since all persons cannot know the telephone number of the registrant as well when the telephone number is registered as private. Particularly, in recent years, cellular phone replacements are frequently carried out and this extremely increases the opportunities of changing the telephone number, so that the aforementioned disadvantage becomes obvious.

As an actual problem, when his/her telephone number is changed, the aforementioned problem can be solved to some degree by individually telling only a person whom he/she wants to inform of his/her telephone number as private in the above directory service. However, the registrant cannot help feeling the annoyance of telling his/her telephone number individually in some cases. Moreover, communication with the person whom he/she has desired to inform originally cannot be carried out afterward by the leakage in some instances.

The present invention has been made with consideration given to the aforementioned problems and an object of the present invention is to provide a directory assistance method and telephone directory assistance system that are capable of surely informing his/her telephone number to a person whom he/she wants to inform without requiring time and labor in a directory assistance service.

In order to attain the above object, according to a first aspect of the present invention, in a method for informing a telephone number of a registrant to an inquirer, comprising the steps of accepting a request for a telephone number of the registrant from the inquirer, judging whether the registrant is registered in a telephone number data base, judging whether an information from the inquirer is transmitted to the registrant at least without informing the telephone number of the registrant to the inquirer, based on a disclosing condition registered in the data base when the registrant is registered in the telephone number data base, and causing the inquirer to input information and the registrant to be capable of being informed of the input information when informing the telephone number of the registrant.

According to a second aspect of the present invention, in a system informing a telephone number of a registrant to an inquirer, comprising a data base in which at least a telephone number of a registrant and a disclosing condition on whether an information from the inquirer is transmitted to the registrant without informing the telephone number to the inquirer, are associated with each other, and means for informing the registrant of the information from the inquirer.

The present invention is applicable to a telephone directory assistance service that informs a telephone number by informing an address, a name and the like to an operator or service that informs a new telephone number using an old telephone number as a clue.

According to the present invention, once there is a request from the inquirer for a telephone number, whether an information from the inquirer is transmitted to the registrant without informing the telephone number of the registrant to the inquirer is judged, and causing the inquirer to input information and the registrant to be capable of being informed of the inputted information when informing the telephone number of the registrant. The registrant decides whether the telephone number is informed to the inquirer, based on the informed information. In a case of informing, for example, the registrant may inform it to the inquirer via a telephone and the like directly, so that he/she can be sure to inform a person who has informed his/her telephone number without requiring time and labor.

Here, the inquirer may be requested to input information and the inputted message may be caused to be capable of being played back to the registrant. In such case, when a terminal of the registrant is a conventional telephone set, the recorded message may be transmitted to the registrant and when a terminal of the registrant is a cellular phone, the registrant is informed that the message is recorded and he/she may be caused to gain access for the playback of the recorded message from the cellular phone.

In this way, the voice message is used as information to be transmitted to the registrant from the inquirer, so that burdensome operations may be reduced.

Moreover, the inquirer may be requested for a message with a character signal inputted by a push button operation as the information and the inputted message may be informed to the registrant. In such case the inputted message may be converted to a vocal sound and informed to the registrant. In addition, the inquirer may be requested to transmit an e-mail as the information and the registrant may be caused to receive the transmitted e-mail. With this, the telephone number of the inquirer and the like may be known without fail.

Furthermore, as the disclosing condition registered in the data base, in response to the request for the telephone number from the inquirer, the condition that always inform the telephone number and the condition that always refuses to inform the telephone number may be able to be set for each registrant and the request for the telephone number of the registrant may be accepted by accessing an old telephone number of the registrant, and the corresponding telephone number may be searched from the data base in which the old telephone number and the new telephone number of the registrant are associated with each other.

Other features and advantages of the present invention will become more apparent from the following description and the accompanying drawings.

BRIEF DESCRIPTION OF THE DRAWINGS

FIG. 13 shows an example of an interface screen for explaining the registration of the changer information;

FIG. 16 shows an example of the interface screen for explaining the registration of the changer information;

FIG. 17 shows an example of the interface screen for explaining the registration of the changer information;

FIG. 19 shows an example of an interface screen for explaining the registration of inquirer information;

FIG. 22 shows an example of the interface screen for explaining the registration of the inquirer information;

FIG. 26 shows an example of the interface screen for explaining the inquiry process in which the special-purpose software for inquiry is used;

FIG. 31 shows an example of the interface screen for explaining the inquiry operation by the address inquiry system;

FIG. 32 shows an example of the interface screen for explaining the inquiry operation by the address inquiry system;

FIG. 33 shows an example of the interface screen for explaining the inquiry operation by the address inquiry system;

FIG. 35 shows an example of the interface screen for explaining the inquiry operation by the address inquiry system;

FIG. 36 shows an example of the interface screen for explaining the inquiry operation by the address inquiry system;

FIG. 38 shows an example of the interface screen for explaining the inquiry operation by the address inquiry system.

BEST MODE FOR CARRYING OUT THE INVENTION

Preferred embodiments of the present invention will be explained below with reference to the drawings.

(First Embodiment)

Figure 1:
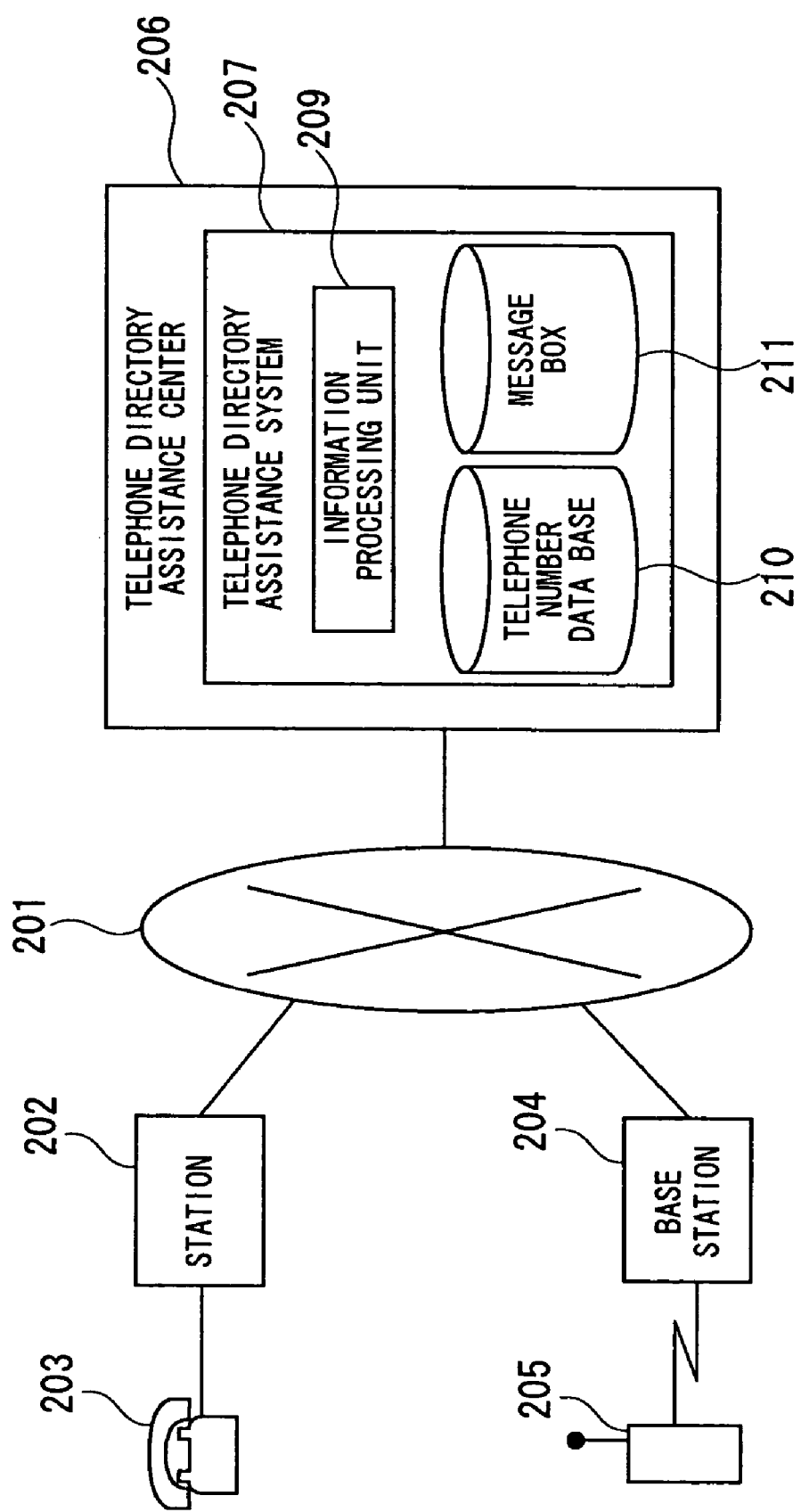
FIG. 1 is a view showing the schematic entire configuration of a first embodiment to which the present invention is applied.

FIG. 1 is a view showing the schematic entire configuration of a first embodiment to which the present invention is applied.

In FIG. 1, reference numeral 201 indicates a public network, a conventional telephone set 203 is connected to the public network 201 via a station 202. Moreover, a cellular phone 205 is wirelessly connected thereto via a radio base station 204.

Furthermore, a telephone directory assistance service center 206 is connected to the public network 201. As the telephone directory assistance service center 206, for instance, in the case of Japan as an example, there is conventionally used a center, which is provided by NTT, offers serve by connection with a telephone number "104." In addition to this, dedicated centers, which are provided separately therefrom, may be, of course, used.

In the telephone directory assistance service center 206, an operator in the center basically informs the telephone number to a person, who desires to be informed about telephone number, (hereinafter referred to as "inquirer" in the first embodiment) by voice. Additionally, the service on telephone number may be automatically executed by access to the old telephone number from the inquirer.

In the telephone directory assistance service center 206, there is provided a telephone directory assistance system 207, which is used to provide service on the telephone number. The telephone directory assistance system 207 is mainly composed of an information processing unit 209 for performing processing such as telephone number searching, etc., a telephone number data base 210 in which various kinds of data on the telephone numbers are registered and a message box 211.

Figure 2:
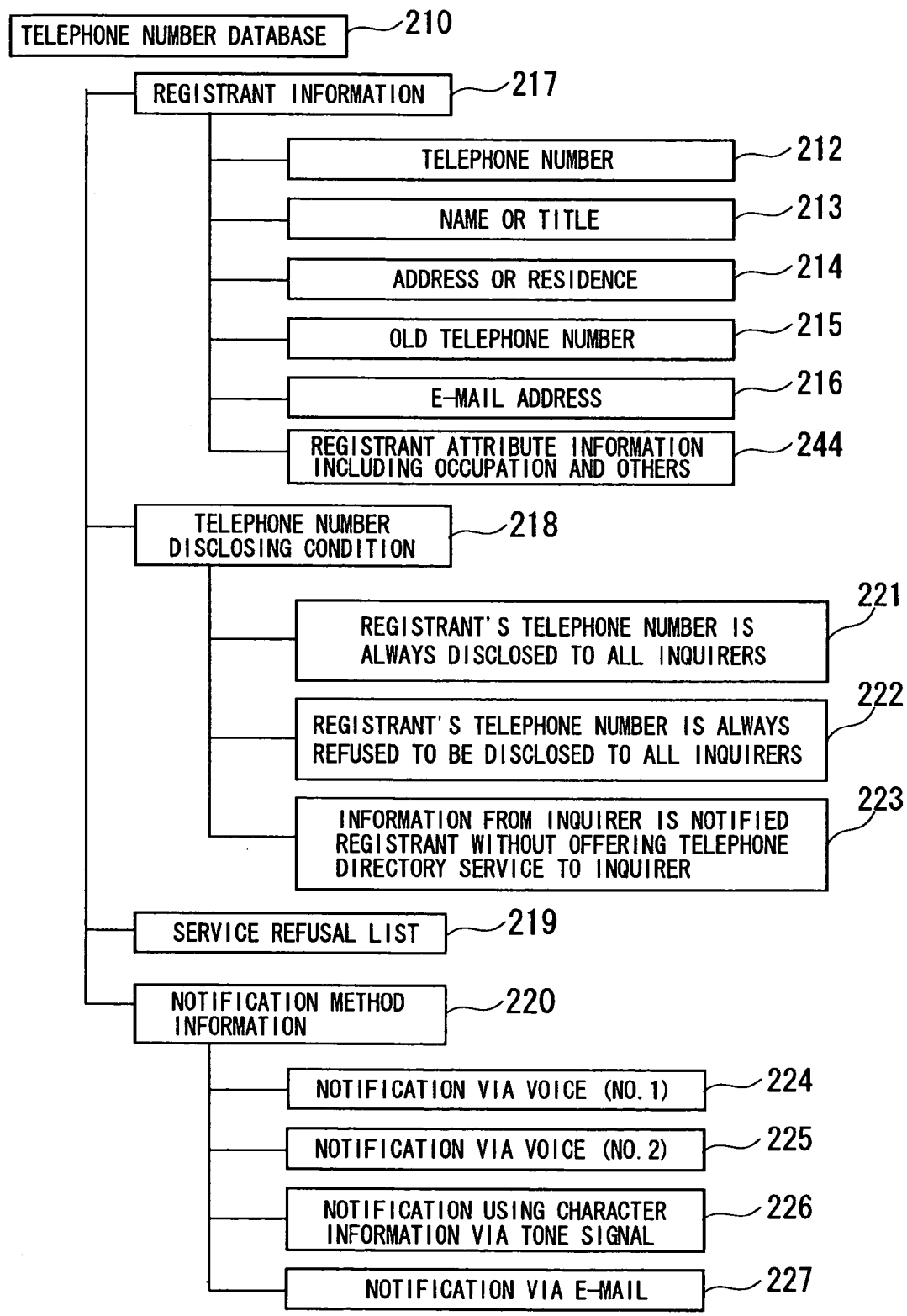
FIG. 2 is a view showing the configuration of a telephone number data base.

FIG. 2 is a view showing the configuration of telephone number data base 210.

As shown in FIG. 2, the telephone number data base 210 stores at least registrant information 217, which includes a telephone number 212 of a person, who has received the registration of the telephone number to be subjected to service by the telephone directory assistance service center 206, (hereinafter referred to as "registrant" in the first embodiment) a name or title 213, an address or residence 214, an old telephone number 215, an e-mail address 216, and registrant attribute information 244 including an occupation and others, a telephone number disclosing condition 218, a service refusal list 219 that stores a list of inquirers, who refuse service on the telephone number, and notifying method information 220 that stores notifying methods of information from inquirers to the registrants.

In the telephone number disclosing condition 218, there are preregistered operator's response patterns occurred when the operator receives information indicating name of the registrant, address, old telephone number from the inquirer or patterns occurred when the system automatically responses. In this embodiment, the registrant can set by selecting one from the following three kinds of responses (1) to (3):

(1) "the telephone number of the registrant is always disclosed to all inquirers." (221 in FIG. 2).

This response pattern means that the telephone number of the registrant is always disclosed to all inquirers instead of the point that information from the inquirer is informed to the registrant without informing the inquirer of the telephone number. According to this embodiment, this item is selected, thereby the telephone number of the registrant is always disclosed to all inquirers unconditionally. However, a telephone number disclosure list is prepared so that the telephone number of the registrant may be disclosed to only inquirers that match this list.

(2) "The telephone number of the registrant is always refused to be disclosed to all inquirers." (222 in FIG. 2).

This response pattern means that the telephone number of the registrant is always rejected to be disclosed to all inquirers instead of the point that information from the inquirer is inform to the registrant without informing the inquirer of the telephone number. Additionally, similar to the aforementioned response, a telephone number non-disclosure list is prepared so that the telephone number of the registrant may be refused to be disclosed to only inquirers matching this list.

(3) "Information from the inquirer is notified the registrant without offering telephone directory service to the inquirer." (223 in FIG. 2).

This response pattern means that information from the inquirer is informed to the registrant without informing the inquirer of the telephone number. For example, as will be described later, this notification is one in which the inquirer is caused to input a voice message and the input voice message is informed to the registrant.

Meanwhile, in this embodiment, the inquirers, who are desirably refused to offer the service, are registered in the service refusal list 219, making it possible to set to refuse the service to the inquirers registered in this service refusal list 219 even if the pattern (1) or (3) is selected.

In the service refusal list 219, it is possible to register a person, who is desirably rejected to provide the service, in advance. However, in this embodiment, even if the registrant performs refusal registration by a terminal operation later according to the pattern (2), the inquirer is automatically registered in the service refusal list 219.

In the notification method information 220, there are stored notification methods of information when the response pattern is the aforementioned (3) (223 in FIG. 2). In this embodiment, the registrant can set a method by selecting one from the following four kinds of notification methods (1) to (4). In addition, after such setting, the registrant can gain access to the telephone directory assistance service center 206 to change the setting. For example, a voice message is first set to be received at a designated telephone number. However, thereafter, the registrant may directly gain access to the telephone directory assistance service center 206 to provide a predetermined operation to the telephone directory assistance system 207 or directly request the operator of the telephone directory assistance service center 206, thereby making it possible to change the setting such that reception is performed via an e-mail at the telephone number or reception is performed at another telephone number.

(1) Notification via voice (No. 1) (224 in FIG. 2)

This notification method is particularly useful when the registrant is the general telephone user. The inquirer is requested to record a voice message, and a transmission is given to the registrant, so that the recorded voice message is informed from the message box 211.

(2) Notification via voice (No. 2) (225 in FIG. 2)

This notification method is particularly useful when the registrant is the cellular phone user. The inquirer is requested to record a voice message. The registrant is notified that the message has been recorded to cause him/her gain access for playback of the recorded message from the cellular phone. For example, when the message is recorded as mentioned above, the center side sends a signal "presence of message," to the cellular phone of the registrant, and the registrant gains access to the center side and plays back the message from the message box 211.

(3) Notification using character information via a tone signal (226 in FIG. 2)

This notification method means that the inquirer is requested to make a message by inputting a character signal via a push button operation (tone signal) to inform the registrant of the input message. Regarding the notification method to the registrant, for example, the character signal may be directly transmitted to the terminal of the registrant in the same manner as the short mail and pocket bell (pager) or the character signal may be converted to voice to be transmitted to the terminal of the registrant.

(4) Notification via an e-mail (227 in FIG. 2)

This notification method means that the inquirer is requested to transmit an e-mail to cause the registrant to receive the transmitted e-mail. The e-mail may be once transmitted to the registrant via the center. Or, the e-mail address of the registrant is presented to the inquirer from the center so that the inquirer may directly transmit the e-mail to the registrant.

Figure 3:
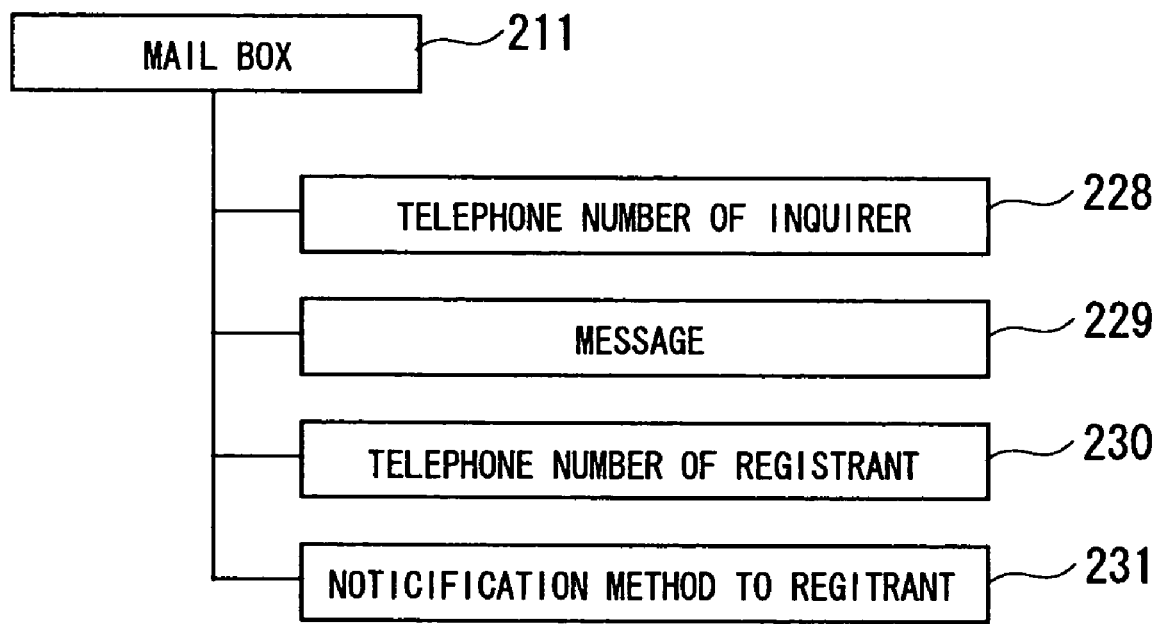
FIG. 3 is a view showing the configuration of a message box.

FIG. 3 is a view showing the configuration of message box 211.

As shown in FIG. 3, in the message box 211, there are stored at least a telephone number of the inquirer 228, a message 229 via voice or data inputted by the inquirer, a telephone number of the registrant 230, and a notification method 231 to the registrant.

Figure 4:
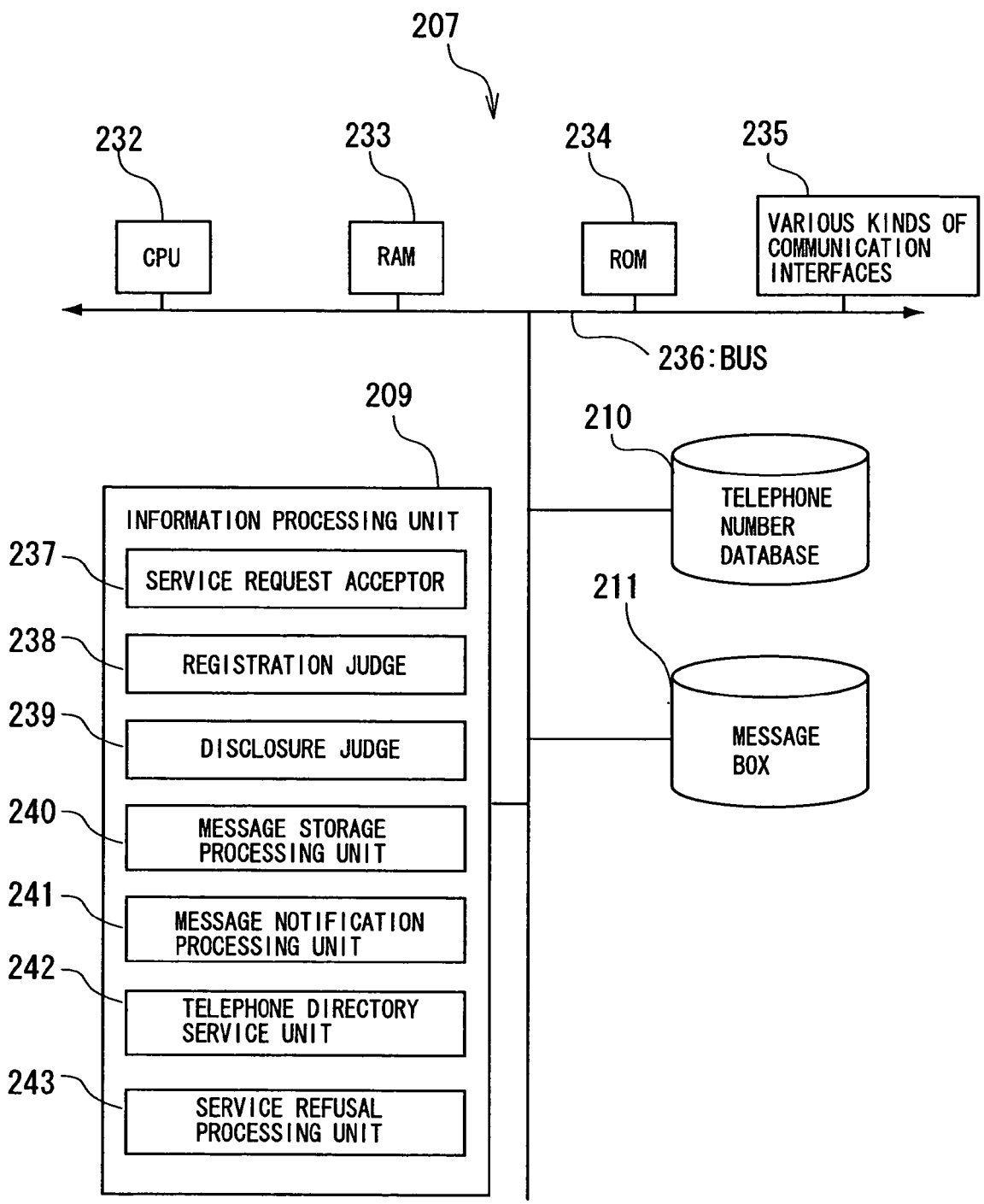
FIG. 4 is a view showing the entire configuration of this system including an information processing unit.

FIG. 4 is a view showing the entire configuration of this telephone directory assistance system 207 including the information processing unit 209.

In the telephone directory assistance system 207, the information processing unit 209, telephone number data base 210 and message box 211 are connected to a bus 236 to which a CPU 232, a RAM 233, a ROM 234, and various kinds of communication interfaces 235 are connected.

As shown in FIG. 4, the information processing unit 209 is composed of at least a service request acceptor 237 that accepts a request for the telephone number of the registrant based on the old telephone number informed from the inquirer, a registration judge 238 that judges whether the registrant is registered in the telephone number data base 210 based on the old telephone number, name, address and the like, a disclosure judge 239 that judges whether service on the telephone number is offered or refused to the inquirer or the message from the inquirer is informed to the registrant without informing the inquirer of the telephone number based on the disclosing condition 218 registered in the telephone number data base 210, a message storage processing unit 240 that performs processing for urging the inquirer to input the message to store the input message to the message box 211, a message notification processing unit 241 that informs the registrant of the message stored in the message box 211 according to the notification method 210, a telephone directory service unit 242 that informs the telephone number that is possible to be disclosed to the inquirer, and a service refusal processing unit 243 that performs registration processing and service refusal processing to the service refusal list 219.

These elements 237 to 243 and the telephone number data base 210, and the message box 211 are practically composed of computer programs installed in a storage medium of a computer system as shown in FIG. 4, and show various functions of this invention by being read and executed in the RAM 223 by means of the CPU 232.

The explanation will be next given of the telephone directory service method using the above-configured telephone directory assistance system 207.

As a telephone directory service method using the telephone directory assistance system 207, for example, there are one case in which the inquirer gains access to the center 206 to receive serve via the operator and the other case in which the telephone directory assistance system 207 automatically accepts service when the inquirer (a person who simply makes a call) gains access to the old telephone number (this is a mere telephone number to the inquirer).

Figure 5:
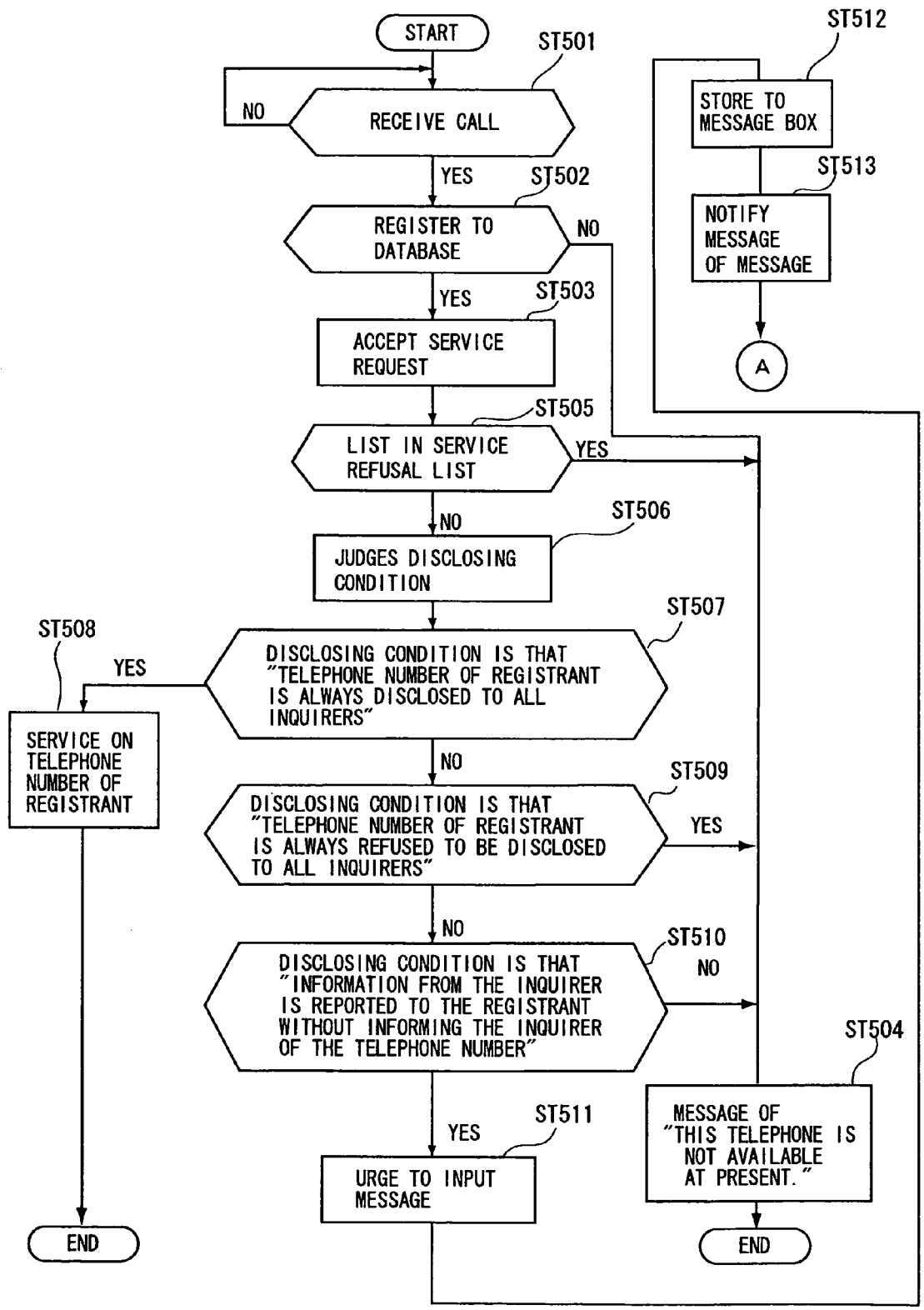
FIG. 5 is a flowchart (No.1) showing an operation when an inquirer gains access to an old telephone number and automatically receives service from the system.

An explanation will be first given of an operation that is performed when the telephone directory assistance system 207 automatically accepts service based on the flowchart of FIG. 5.

For example, when the inquirer originates a call to the registrant using the old telephone number via the cellular phone 205, this call is transferred to the center 206 via, for example, the public network 201.

When the telephone directory assistance system 207 of the center 206 receives the call (step 501), the registration judge 238 searches whether the registrant is registered in the telephone number data base 210 based on the old telephone number included in the call in the telephone directory assistance system 207 (step 502).

When it is registered in the telephone number data base 210, the service request acceptor 237 accepts the call from the inquirer as a service request for the telephone number (step 503). On the other hand, when it is not registered in the telephone number data base 210, a message, for example, "This telephone is not available at present." is sent to the inquirer (step 504) and this process ends. In addition, when the need arises to select a target registration from a plurality of persons in a case in which there are registrations each having a person with the same family and personal name in the same residential area or a case in which there are registrations corresponding to the old telephone number because of time lag before and after the period of service, "registrant attribute information 244 including an occupation and others" relating to each registrant is presented to the inquirer, making it possible to assist the inquirer with his/her selection. In other words, the inquirer may select the target registrant based on the presented "registrant attribute information 244 including an occupation and others."

After acceptation of the service request, the service rejection processing unit 243 judges whether the inquirer is listed based on the service refusal list 219 (step 505). Then, when it is listed, a message, for example, "This telephone is not available at present." is sent to the inquirer (step 504) and this processing ends.

On the other hand, when the inquirer is not listed in the service refusal list 219, the disclosure judge 239 judges the disclosing condition of the registrant corresponding to the old telephone number based on the disclosing condition 218 (step 506).

Here, when the disclosing condition 218 is that "the telephone number of the registrant is always disclosed to all inquirers" (step 507), the telephone directory service unit 242 informing the telephone number of the registrant (step 508), and the processing ends. In the service on the telephone number, means such as voice, a tone signal, an e-mail, etc can be used.

When the disclosing condition 218 is that "the telephone number of the registrant is always refused to be disclosed to all inquirers" (step 509), a message, for example, "This telephone is not available at present." is sent to the inquirer (step 504) and this processing ends.

When the disclosing condition 218 is that "information from the inquirer is informed to the registrant without informing the inquirer of the telephone number" (step 510), the message storage processing unit 240 sends a message, for example, "This contractor's telephone number has been transferred. A message can be sent to the transfer. Input the message after the tone." to the inquirer (step 511). Then, a message of the inquirer, for example, "This is Paul. Please tell me John's new telephone number. Contact me at this telephone number: 090-0000-0000." is stored in the message box 211 (step 512). In the message box 211, this message 229 is stored to be associated with the telephone number of the inquirer 228, telephone number of the registrant 230, and the notification method 231 to the registrant. In addition, the message may be input in the form of dialogue. For example, messages are exchanged between the center and the inquirer in such a form that "First of all, your name, please." (Center), "This is Taro Shokai." (Inquirer), "Next, your message, please" (Center), "I had a talk with you at the forum sponsored by . . . , previously. I want to talk with you over business." (Inquirer), "Finally, your contact telephone number, please." (Center), "My contact telephone number is 00?1111?2222. You can contact me between nine in the morning and eight in the evening." (Inquirer). The center sends the registrant the voice message to which the above voice message of the inquirer are combined: "This is Taro Shokai. I had a talk with you at the forum sponsored by . . . , previously. I want to talk with you over business. You can contact me between nine in the morning and eight in the evening." This obtains an effect that stops the inquirer from forgetting to record the telephone number for return or the name of the inquirer and further an effect that helps to prevent a prank telephone call.

When the messages are stored in this way, the message notification processing unit 241 provides notification to the registrant according to the notification method 231 (step 513).

Figure 6:
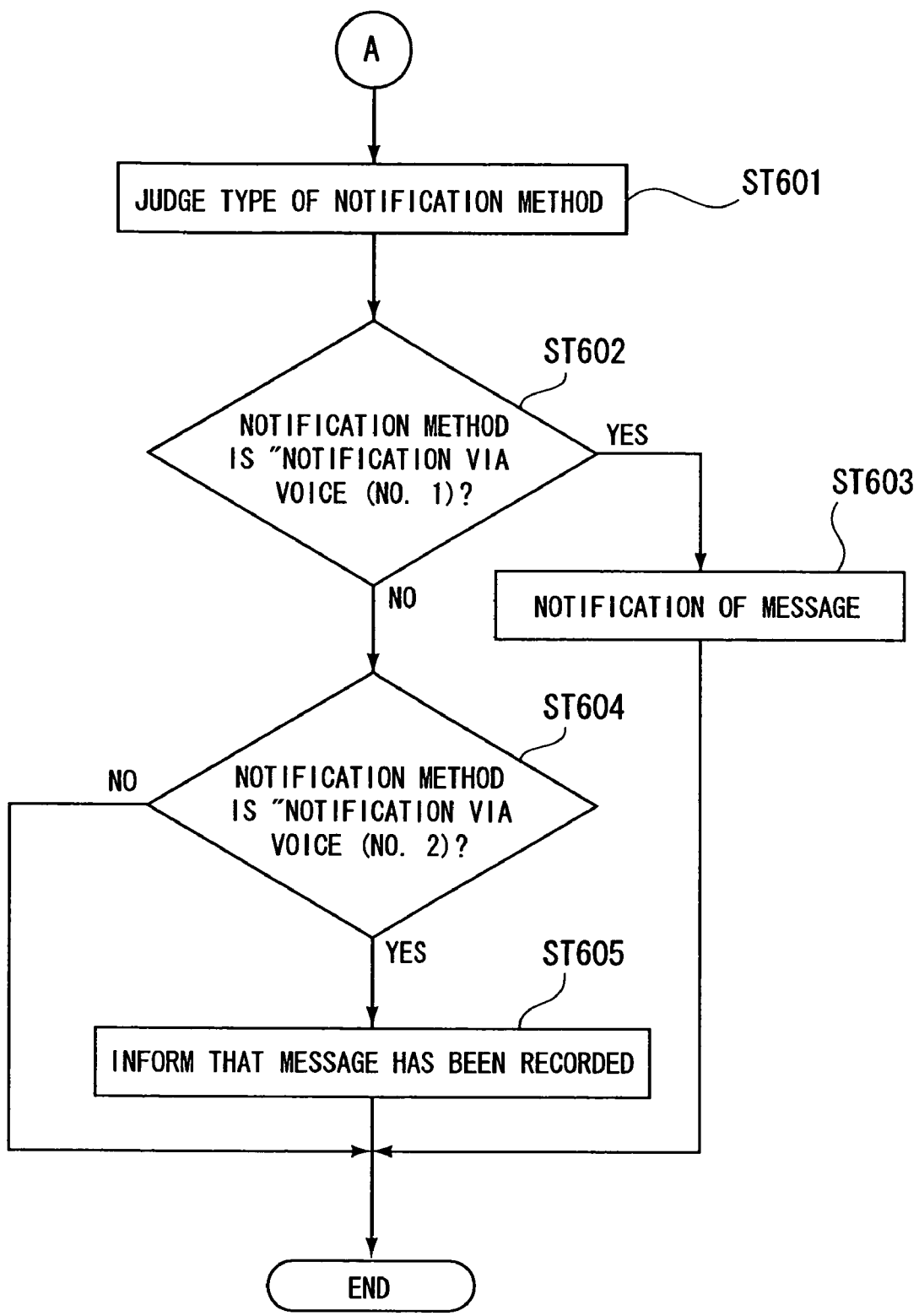
FIG. 6 is a flowchart (No.2) showing an operation when an inquirer gains access to an old telephone number and automatically receives service from the system.

FIG. 6 is a flowchart showing an operation of message notification to the registrant by the message notification processing unit 241.

First of all, the message notification processing unit 241 judges the type of notification method 231 (step 601). When the notification method is "notification via voice (No. 1)" (step 602), a transmission is given to the registrant and the recorded message is informed from the message box 211 (step 603).

Figure 7:
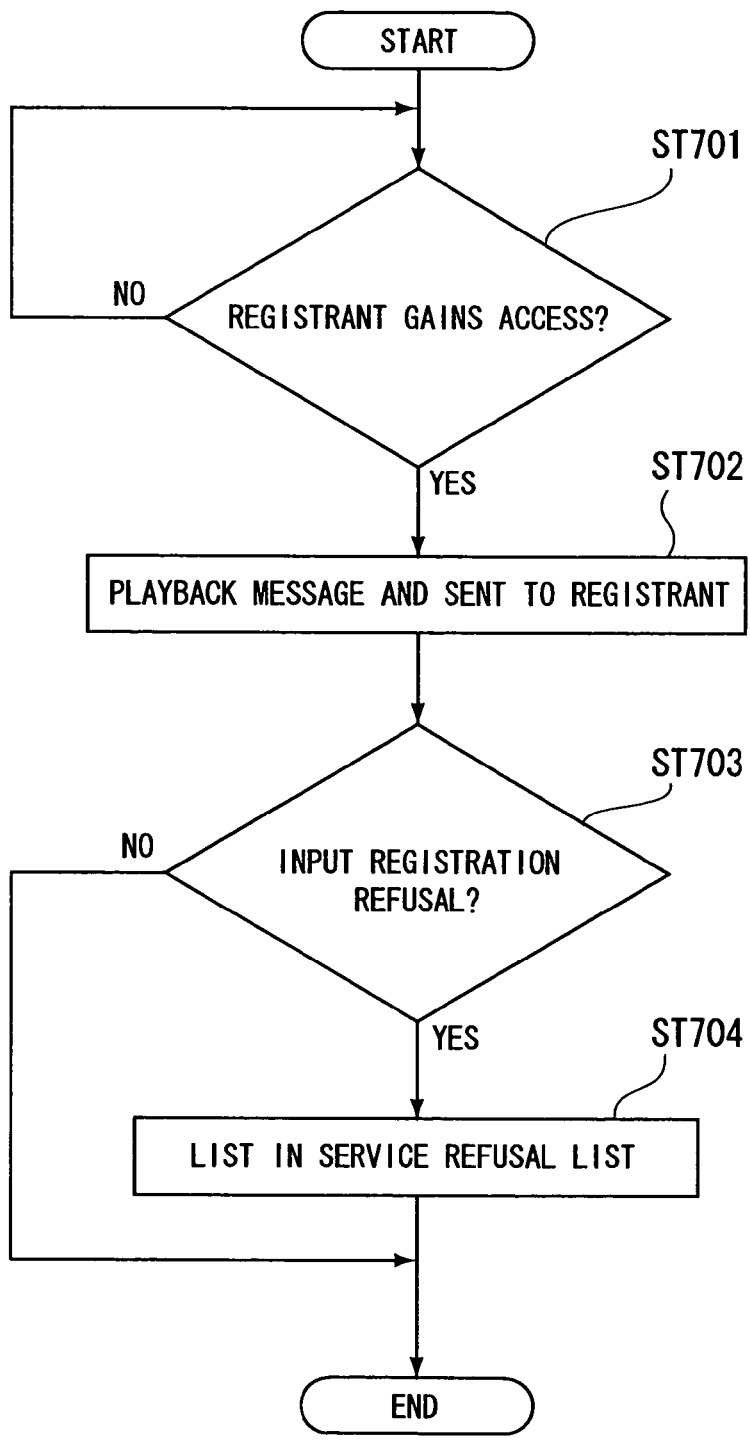
FIG. 7 is a flowchart (No. 3) showing an operation when an inquirer gains access to an old telephone number and automatically receives service from the system.

Moreover, when the notification method is "notification via voice (No. 2) (step 604), the registrant is informed that the message has been recorded in his/her cellular phone (step 605). After that, as shown in FIG. 7, when the registrant gains access to the center 206 (step 701), the message is played back from the message box 211 and sent to the registrant (step 702). Thereafter, when, for example, the registrant presses a specific button on the cellular phone to input registration refusal (step 703), the inquirer is listed in the service refusal list 219 (step 704). As a result, even if the inquirer makes a telephone call using the old telephone number afterward, any message is not informed to the registrant.

From the message, the registrant can know that the inquirer has the will to take over via a telephone. Then, when the registrant desires to inform this inquirer of a new telephone number, the registrant may call the inquirer to tell the new telephone number. When the registrant does not desire to inform this inquirer of a new telephone number, the registrant does not have to make contact with the inquirer. Therefore, according to this embodiment, since confirmation is sent to the registrant using the message every time when an inquire is sent from such the inquirer, it is possible to surely inform his/her telephone number to a person who he/she desires to inform without requiring time and labor in the directory assistance service.

Additionally, in the aforementioned embodiment, the voice message is informed to the registrant from the inquirer via the center. However, in addition to such the message notification method, notification using character information via a tone signal (226 in FIG. 2) may be used and notification via an e-mail (227 in FIG. 2) may be used.

Moreover, the aforementioned embodiment explained the case in which the telephone directory assistance system 207 automatically accepted service when the inquirer gained access to the old telephone number. However, the present invention is applicable to a case in which, for example, the inquirer gains access to the center 206 and receives service via the operator.

In this case, when the inquirer gains access to the center 206, the operator answers to the inquirer and asks him/her to tell an old telephone number, an address, a name and the like that correspond to a telephone number on which he/she desires to receive service, and inputs them to the telephone directory assistance system 207. As a result, the same operations as the aforementioned embodiment (operations including step 502 in FIG. 5 and afterward) are carried out as follows. More specifically, according to the aforementioned first embodiment, upon reception of the presentation of the old telephone number from the inquirer, the center informs the new telephone number, refuses to inform, and sends a message to the registrant. However, the present invention is not limited to this. Namely, the center receives the presentation, which is a so-called "clue", which can specify the registrant, that is, any information relating to the registrant such as an address, a name and the like, from the inquirer as well as the presentation of the old telephone number from the inquirer. Then, the center informs the telephone number of the specified registrant, rejects the service, and sends the message to the registrant. Then, the service on the telephone number, rejection of the service, and notification of message to the registrant are left on the registrant's will. Thereby, the registrant can arbitrarily select whether he/she "tells/does not tell" his/her telephone number at his/her will with respect to the service request for the telephone number from a certain inquirer. Moreover, the present invention is intended to adaptively deal with such a way of selection in accordance with the registrant and inquirer circumstances (for example, the type of terminal they possess).

In addition, the aforementioned first embodiment implements the present invention using the public network. However, the present invention can be implemented even in the other network system such as the Internet and the like. In this case, it is possible to use a cellular phone, a personal computer and the like as terminals for the inquirer and registrant.

The respective elements of the second embodiment may be adopted to the system of this embodiment as much as possible. For example, a registration method, a changer authentication method and an inquirer authentication method to be described later may be, of course, applied to the system of this embodiment.

(Second Embodiment)

Figure 8:
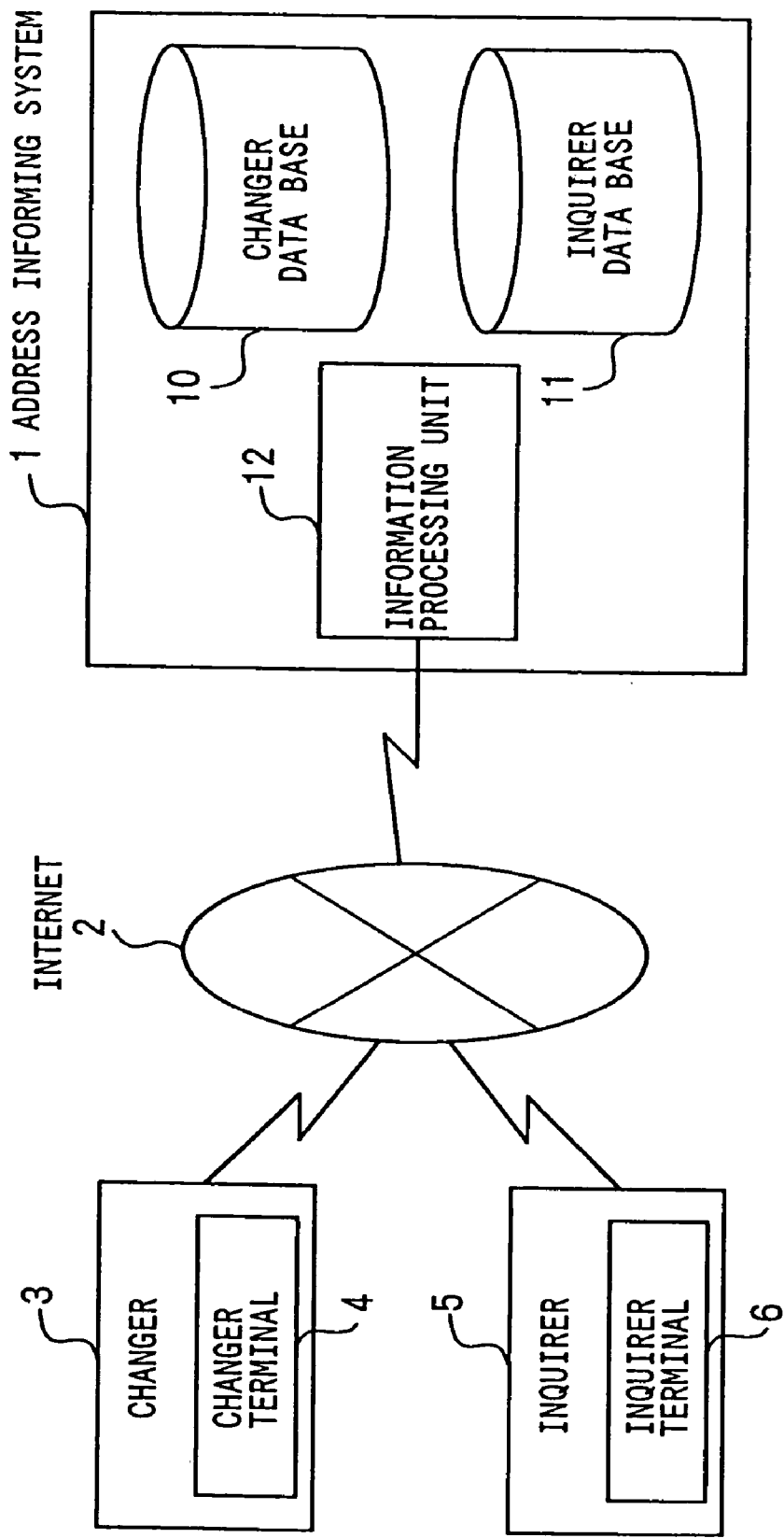
FIG. 8 is a schematic diagram showing the entire configuration of a second embodiment of the present invention.

As shown in FIG. 8, an address inquiry system 1 according to this one embodiment is connected to an Internet 2 and structured to be able to bi-directionally communicate with a terminal (a changer terminal 4) of a changer 3 and a terminal (an inquirer terminal 6) of an inquirer 5.

The changer 3 is defined here as an individual or a corporation (hereinafter defined as an individual in this embodiment) who has moved, for some reason, from an old address to a new address, has changed his or her own address from the old address to the new address, or has stopped the use of the old address. The inquirer 5 is defined here as an individual or a corporation (hereinafter defined as an individual in this embodiment) which inquires about the new address of the changer 3 since an access by the old address of the changer 3 is refused in transmitting e-mail, requesting data, and the like to the old address.

Further, an address is defined here as information for specifying a position of his or her own in communication by the use of existing communication means, and an e-mail address, an IP address, a URL, a telephone number, a mail address, and the like are given as its examples. When these addresses are unknown or incorrect, it is impossible to communicate with the other party through the use of their corresponding communication systems.

An object of the present is to provide the address inquiry system 1 capable of flexibly coping with an intention of the changer 3 when the inquirer 5 inquires about the new address based on the old address of the changer 3.

Elements of this embodiment will be explained below in detail.

This address inquiry system 1 is mainly composed of a changer data base 10 storing information about the changer 3, an inquirer data base 11 storing information about the inquirer 5 who inquires about the new address, and an information processing unit 12 processing the inquiry from the inquirer 5 based on the information stored in these data bases 10 and 11.

These elements will be explained below.

(Changer Data Base)

Figure 9:
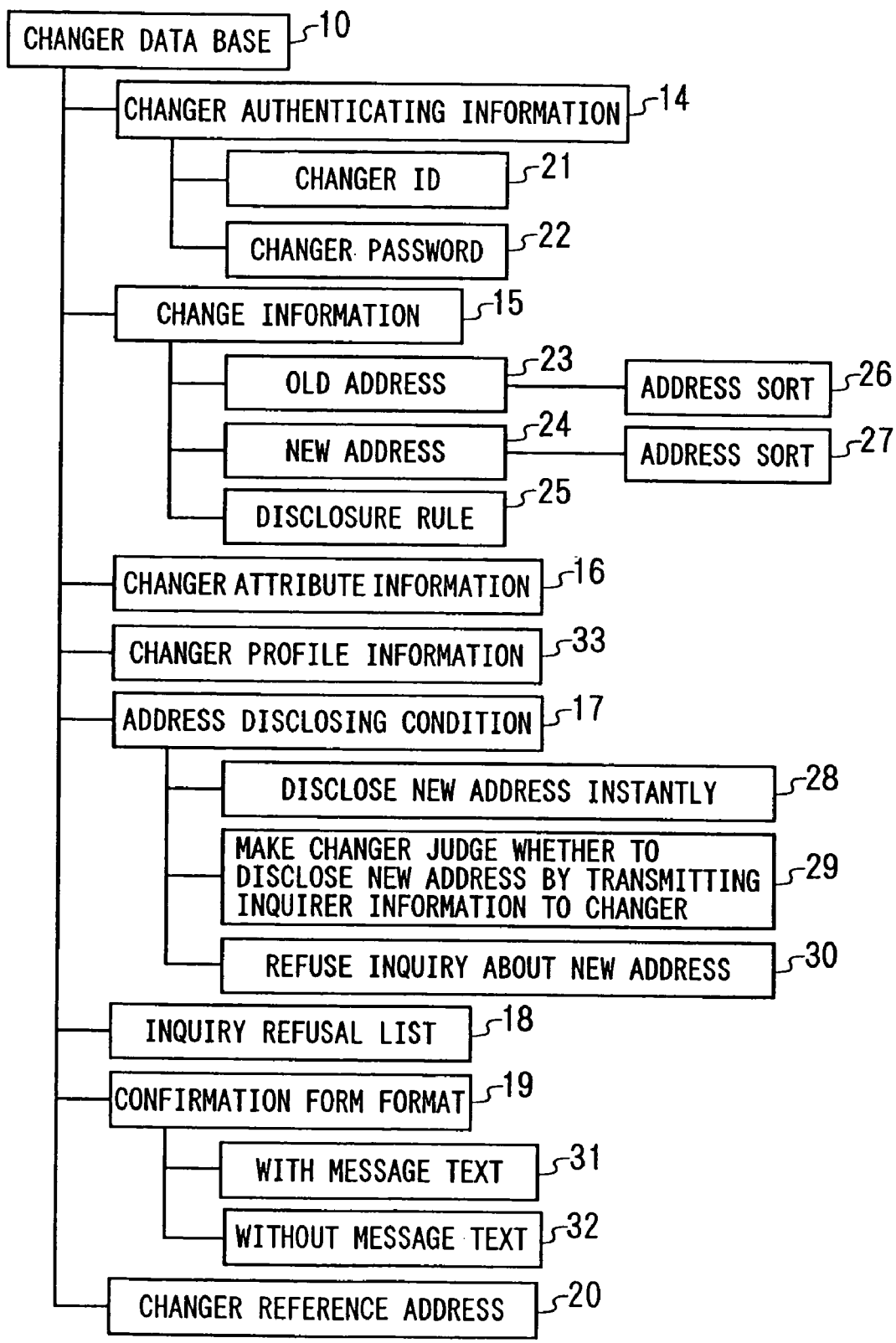
FIG. 9 is a block diagram showing the configuration of a changer data base.

As shown in FIG. 9, the changer data base 10 stores a changer authenticating information 14 including a changer ID 21 and a changer password 22 for specifying the changer 3, change information 15 including one, or two or more old addresses 23 and a new address 24, a changer attribute information 16 storing the property of the changer 3, a changer profile information 33 for characterizing the changer 3, an address disclosing condition 17 storing responses depending on the inquirers 5, an inquiry refusal list 18 storing a list of the inquirers 5 who are refused an inquiry, a confirmation form format 19 which is sent to the changer 3 to confirm whether the new address 24 is disclosed or not, and a changer reference address 20 (an e-mail address) provisionally assigned to the changer 3.

The changer authenticating information 14 such as the changer ID 21 and the changer password 22 is information required for security when information is registered or changed in the changer data base 10 and issued to the changer 3 who has registered the new address 24 and the like in the address inquiry system 1.

The change information 15 is composed of a disclosure rule 25 in addition to the old address 23 and the new address 24 described above. The sorts of addresses which can be registered in this embodiment are four sorts such as an e-mail address, a home page URL, a telephone number, and an address, and the changer 3 is requested to register the old address 23 and the new address 24 concerning at least one or more sorts out of the aforesaid sorts. In this embodiment, after the old address 23 and the new address 24, codes 26 and 27 denoting the sorts of these addresses are given (FIG. 9). Incidentally, two or more old addresses 23 or new addresses 24 may be registered per one sort.

Moreover, by setting the disclosure rule 25, the changer 3 can freely set the sort of the new address 24 to be disclosed when receiving an inquiry with the presentation of each old address 23. Namely, when any of the aforesaid four sorts of old addresses 23 is presented, the new address 24 different from the presented old address 23 in sort can be disclosed or a plurality of new addresses 24 can be disclosed. For example, such setting that a new e-mail address is disclosed when an inquiry with the presentation of an old telephone number is received, or a new e-mail address and a new home page URL are disclosed when an inquiry with the presentation of an old mail address is received can be performed.

The changer attribute information 16 is one in which the changer 3 previously registers information other than the old address 23 such as a name and an address capable of distinguishing and specifying the changer 3 himself or herself. The changer profile information 33 is one in which the changer 3 previously registers a profile other than the changer attribute information 16 such as a self-introduction capable of characterizing the changer 3. For example, in many cases, an e-mail address is composed by a combination of alphabets, numbers and symbols, and the like, and the owner thereof cannot be specified by this e-mail address only. Therefore, the changer attribute information 16 and the changer profile information 33 are useful information for confirming whether the owner of the address is the changer 3 of whom the inquirer 5 wishes to inquire.

Response patterns (the numerals 28 to 30 in FIG. 9) of this address inquiry system 1 in the case where an inquiry with the presentation of the old address 23 is received from the inquirer 5 are previously registered in the address disclosing condition 17. In this embodiment, the changer 3 can set a response by selecting one from the following three sorts of responses (1) to (3).

(1) "Disclose a new address instantly." (the numeral 28 in FIG. 9)

This response pattern means that the new address 24 is disclosed to the specific inquirer 5 or the inquirer 5 which fulfills a fixed condition without making the changer 3 confirm whether the new address 24 is disclosed or not. In this embodiment, the new address 24 is disclosed to all the inquirers 5 unconditionally by the selection of this item. Incidentally, it is suitable that a new address disclosure list is prepared and that the new address 4 is disclosed only to the inquirers 5 included in this list without the confirmation of the changer 3.

(2) "Make the changer 3 judge whether to disclose a new address by transmitting information about the inquirer 5 without disclosing the new address Instantly." (the numeral 29 in FIG. 9)

This response pattern means that when the inquirer 5 which inquires about an address fulfills or does not fulfill a specific condition, the information of this inquirer 5 is transmitted to the changer 3 for confirmation. In this case, the changer 5 can judge whether to give permission to disclose the new address 24 after confirming who the inquirer 5 is, for what purpose the inquirer 5 requests the disclosure of the new address 24, and the like from the information about the inquirer 5.

(3) "Refuse an inquiry about a new address instantly." (the numeral 30 in FIG. 9)

This response pattern means that when the inquirer 5 which is going to inquire about an address fulfills or does not fulfill a specific condition, the inquiry about the address is automatically refused. Incidentally, in this embodiment, when this item is selected, inquiries from all the inquirers 5 are refused unconditionally.

Meanwhile, in this embodiment, by registering the inquirers 5, inquiries from whom the changer 3 wishes to refuse, in the inquiry refusal list 18, setting such that inquiries from the inquires 5 registered in this inquiry refusal list 18 are refused even when the pattern (1) or the pattern (2) is selected is possible.

It is possible to previously register the other parties, inquiries from whom the changer 3 wishes to refuse, in the inquiry refusal list 18. In this embodiment, however, also when the response of "Do not disclose new address, and refuse inquiry from this inquirer hereafter" (See the hyperlink 112 in FIG. 30) is selected when the changer 3 makes a judgment in the pattern (2), an e-mail address of this inquirer 5 is automatically registered in the inquiry refusal list 18.

In this embodiment, the respective responses of the patterns (1) to (3) can be set in each of the registered old addresses 23. For example, it is possible that when an inquiry about the new address 24 with the presentation of an old home page URL is received, "Disclose a new address instantly" (the pattern (1)) is selected, and that when an inquiry with the presentation of an old telephone number is received, the response of "Make a changer judge whether to disclose a new address by transmitting information about an inquirer without disclosing the new address instantly." (the pattern (2)) is sent through the address inquiry system 1.

Meanwhile, in the confirmation form format 19, the format of the confirmation form for the permission of disclosure sent from the address inquiry system 1 to the changer 3 can be set in the case of the response pattern (2). Namely, in this embodiment, as will be explained later, the inquirer 5 first makes out an inquiry message for the address inquiry system 1, and the address inquiry system 1 draws up the confirmation form for the changer 3 based on this inquiry message. It is possible to include an important matter (a message text and the like) from the inquirer 5 in this confirmation form. In the confirmation form format 19, "with message text" 31 or "without message text" 32, which means that a message text included in an inquiry message from the inquirer 5 is included or not included in the confirmation form for the changer 3, can be selected.

As will be explained later, even if the "without message text" 32 is set in the confirmation form format 19, the changer 3 can obtain the message text from the inquirer 5 by e-mail later.

The changer reference address 20 is an e-mail address issued by the address inquiry system 1 to exchange communications including the confirmation form with the changer 3, and issued when the changer 3 has no e-mail address or does not want to use its own e-mail address even if he or she has the address, or issued for ensuring security.

(Inquirer Data Base)

Figure 10:
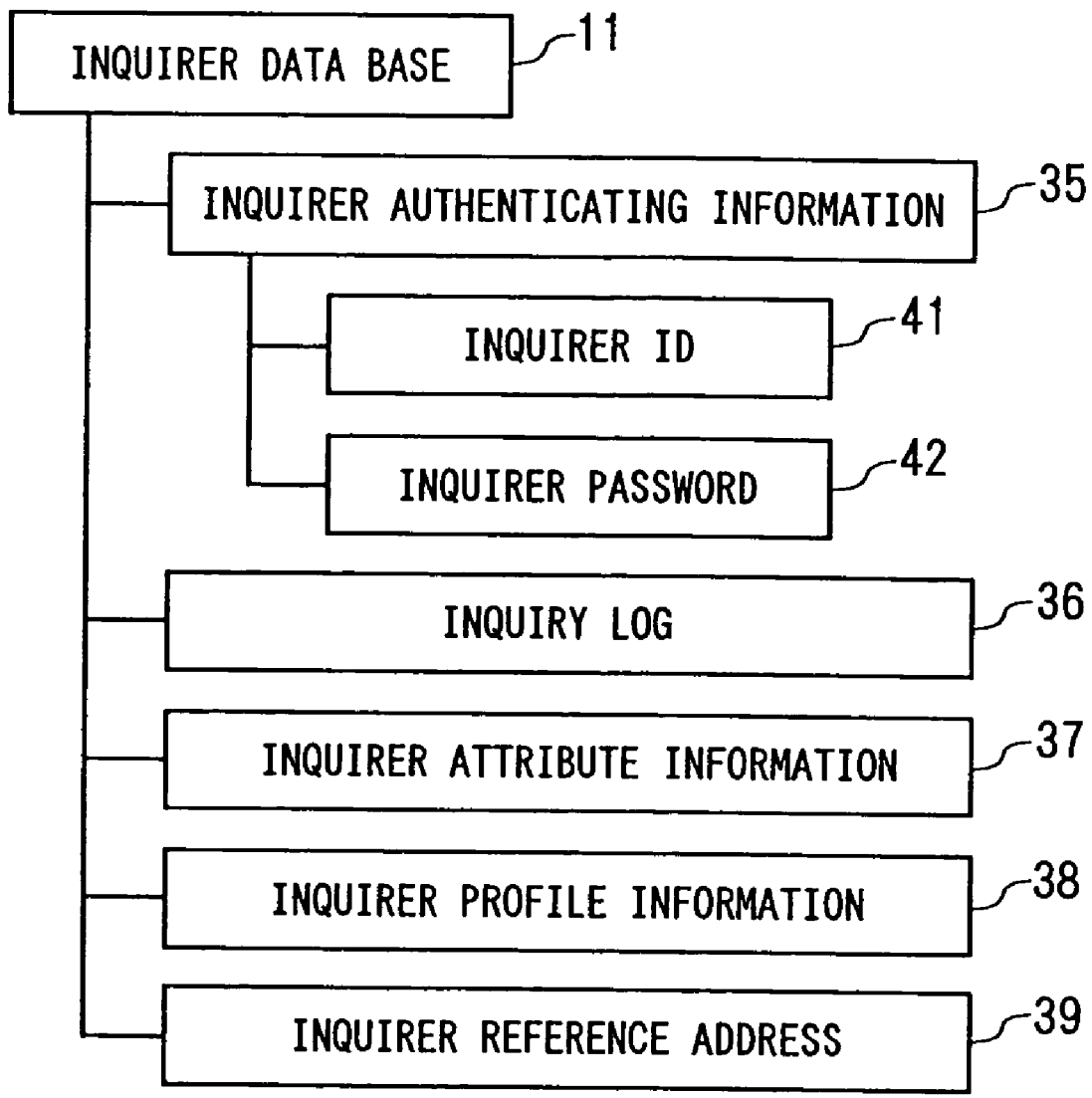
FIG. 10 is a block diagram showing the configuration of an inquirer data base.

Meanwhile, as shown in FIG. 10, the inquirer data base 11 stores an inquirer authenticating information 35 composed of an inquirer ID 41 and an inquirer password 42 for authenticating the inquirer 5, an inquiry log 36, an inquirer attribute information 37, an inquirer profile information 38, an inquirer reference address 39, and the like.

The inquirer authenticating information 35 such as the inquirer ID 41 and the inquirer password 42 is necessary information in terms of security when a demand for the search for the new address 24 from the inquirer 5 is executed and its result is confirmed.

The inquiry log 36 is information for monitoring an inquiry process by the inquirer 5, and for example, utilized for confirming whether a response from the changer 3 to the confirmation is within a predetermined period.

The inquirer attribute information 37 is information about the inquirer 5 presented to the changer 3 for making the changer 3 confirm whether the new address 24 is disclosed to the inquirer 5. In this embodiment, this inquirer attribute information 37 is composed of a name, an address (an e-mail address, a telephone number) and the like of the inquirer 5.

The inquirer profile information 38 is a brief composition of introduction for characterizing the inquirer 5 and registered to characterize the inquirer 5 in making the changer 3 confirm whether to disclose the new address 24. The registration of the inquirer profile information 38 is left to the discretion of the inquirer 5, but it is desirable to persuade the inquirer 5 to register it as much as possible since there is a case where the changer 3 refuses the disclosure of the new address 24 since the inquirer 5 is not identified only by an e-mail address and the like.

The inquirer reference address 39 is an e-mail address issued by the address inquiry system 1 to exchange communications including the inquiry message with the inquirer 5, and issued when the inquirer 5 has no e-mail address or does not want to use its own e-mail address even if he or she has the address, or issued for ensuring security.

(Information Processing Unit)

Next, the information processing unit 12 will be explained.

Figure 11:
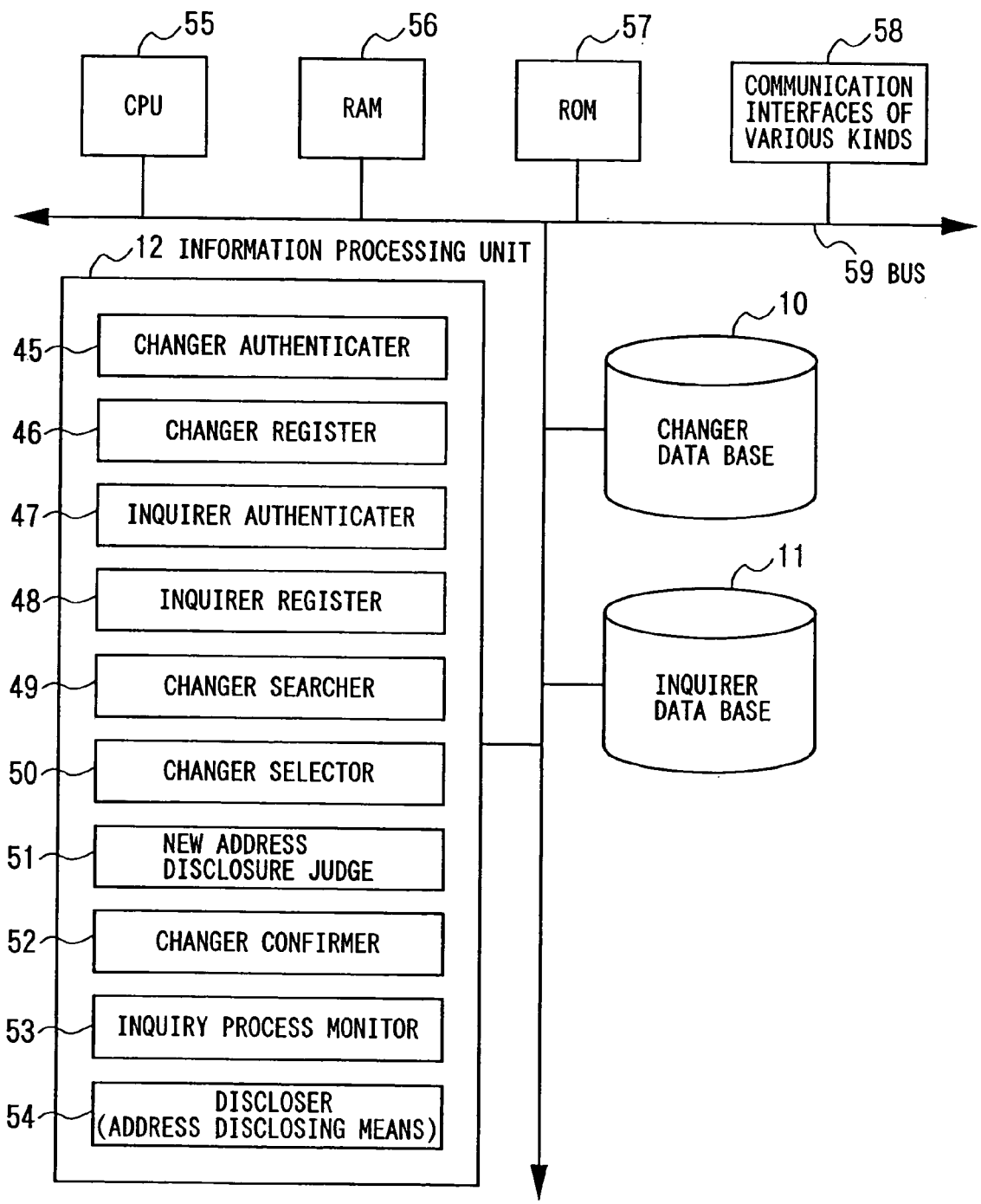
FIG. 11 is a schematic block diagram showing an address inquiry system.

FIG. 11 is a diagram showing the entire configuration of the address inquiry system 1 including this information processing unit 12. The information processing unit 12, the changer data base 10, and the inquirer data base 11 are connected to a bus 59 to which a CPU 55, a RAM 56, a ROM 56, and communication interfaces 58 of various kinds are connected.

As shown in FIG. 11, the information processing unit 12 of the address inquiry system 1 is composed of a changer authenticator 45 authenticating the changer 3, a changer register 46 receiving the change information 15 such as the new address 24 inputted by the changer 3 and storing it in the changer data base 10, an inquirer authenticator 47 authenticating the inquirer 5, an inquirer register 48 registering information about the inquirer 5 in the inquirer data base 11, a changer searcher 49 searching the changer data base 10 with the old address 23 of the changer 3 when the inquirer 5 inquires about the new address 24 of the changer 3, a changer selector 50 making the inquirer 5 select from the changers 3 on whom the inquiry about the new address 24 is executed when there exist plural changers 3 who fulfill the condition in the search, a new address disclosure judge 51 judging whether to disclose the new address 24 to the inquirer 5 based on the address disclosing condition 17 for the new address 24 of the changer 3, a changer confirmer 52 making the changer 3 confirm whether the new address 24 is disclosed or not, an inquiry process monitor 53 administering the period of each inquiry process, and a discloser 54 disclosing an inquiry result to the inquirer 5.

These elements 45 to 54, the changer data base 10, and the inquirer data base 11 are practically composed of computer programs installed in a storage medium of a computer system as shown in FIG. 11 and show various functions of the present invention by being read and executed in the RAM 56 by means of the CPU 55.

The detailed configurations and functions of the elements (45 to 54) will be explained below with reference to flowcharts and interface examples.

(Registration by Changer)

Figure 12:
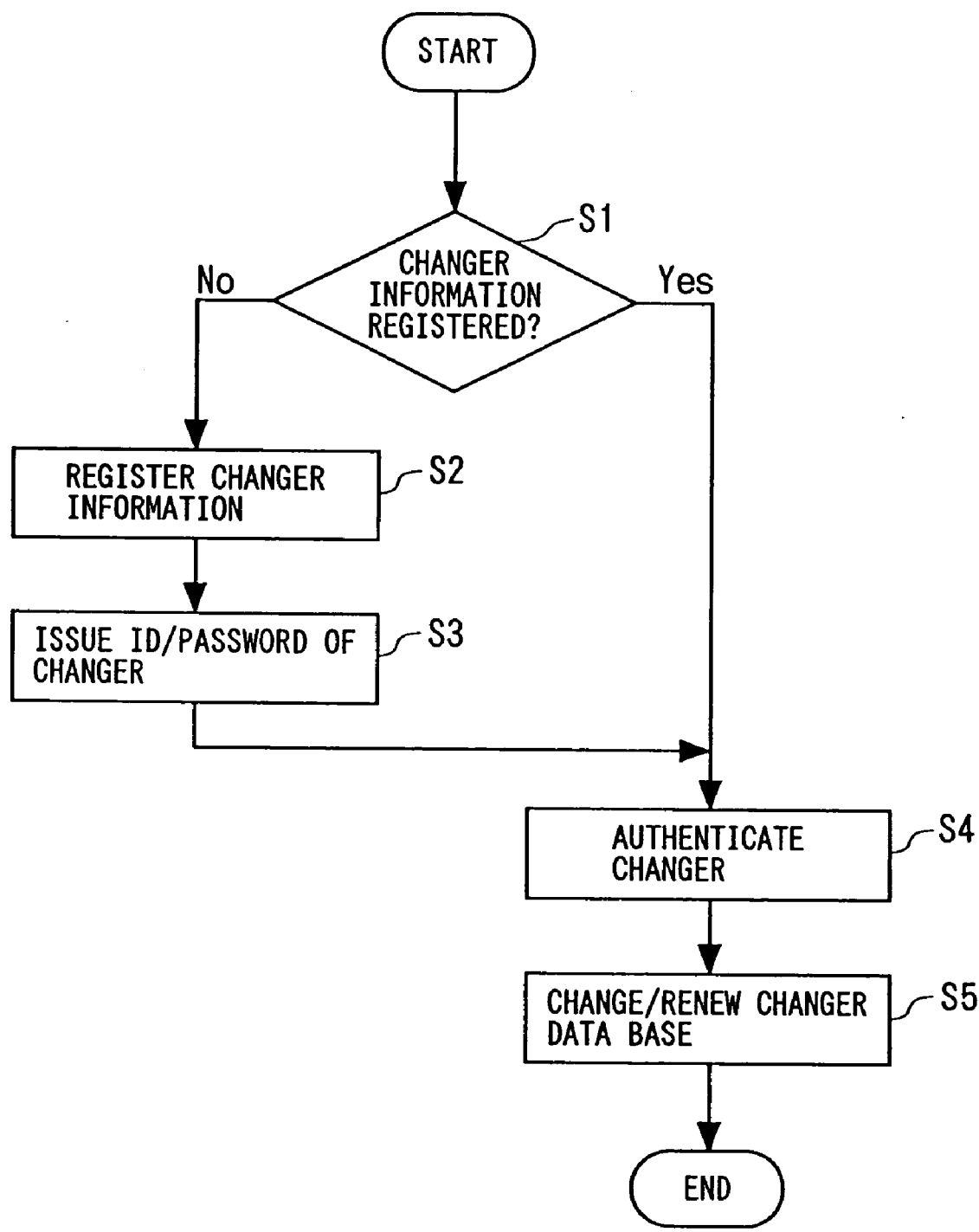
FIG. 12 is a flowchart showing the registration process of changer information.

FIG. 12 is a flowchart showing the registration process of changer information by the changer register 46 and the like.

The changer register 46 first judges whether the changer 3 concerned in an access has already registered changer information or not by inquiring of the changer data base 10 about it (step S1). When the changer information is registered for the first time, the changer register 46 receives the information, registers it in the changer data base 10 (step S2), and thereafter issues the changer ID 21 and the changer password 22 to the changer 3 (step S3).

Meanwhile, when the changer 3 wishes to changes information which has been already registered, the changer authenticator 45 authenticates an access through the use of the changer ID 21 and the changer password 22 by making inquiries at the changer data base 10 (step S4), and thus a change and a renewal of information in the changer data base 10 are permitted (step S5).

FIG. 13 to FIG. 17 show examples of an interface screen when changer information (See FIG. 9) in the changer data base 10 is registered. Although a series of registration processes are executed in connection with a Web site offered by the address inquiry system 1 in this example, registration may be performed by transmitting and receiving necessary information to/from the address inquiry system 1 by e-mail.

FIG. 13 is an example of an interface screen for registering the changer attribute information 16. The changer 3 inputs basic information such as a name 60, a present address 61, a telephone number 62, a FAX number 63, on this screen. The changer register 46 registers this information as the changer attribute information 16 (See FIG. 9). If the changer 3 wishes, the changer reference address 20 for receiving notice from the address inquiry system 1 is set and acquired through this screen. Incidentally, in registering basic information about the changer 3, individual registration or corporate registration can be selected, and an example of the individual registration is shown here.

Figure 14:
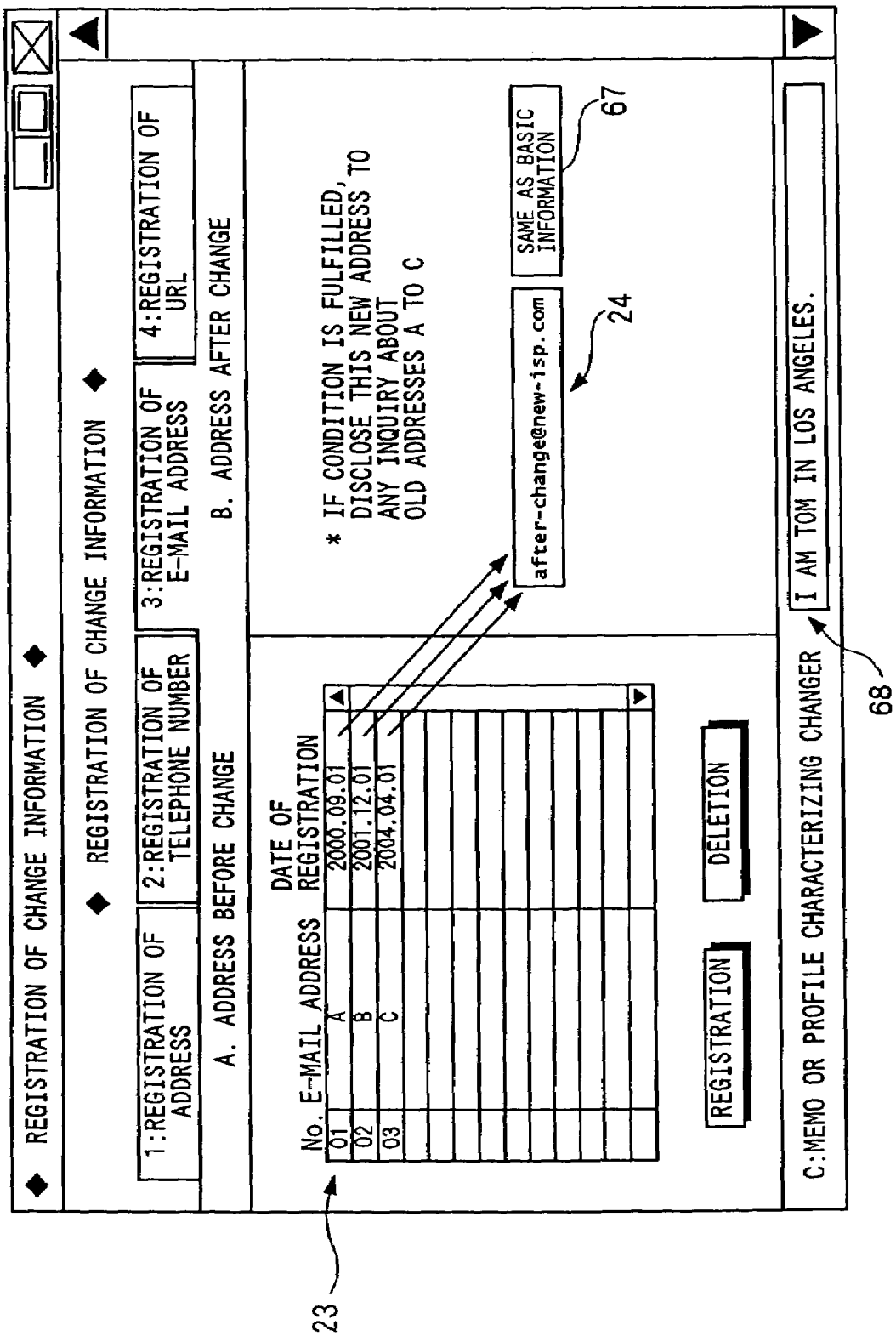
FIG. 14 shows an example of the interface screen for explaining the registration of the changer information.

When the registration of the basic information is completed, the changer register 46 displays an interface screen shown in FIG. 14. This screen is an interface for registering the old address 23 and the new address 24 to be disclosed based on the old address 23 from the change information 15, and FIG. 14 shows an example of a screen for an e-mail address.

The changer 3 registers an address before change (the old address 23) necessary for receiving an inquiry and an address after change (the new address 24) which is disclosed when there is an inquiry on this screen. In this embodiment, a plurality of (three in this embodiment) old addresses 23 can be registered and renewed at any time by the aforesaid process. When the new address 24 to be disclosed is the same as that in the basic information (the changer attribute information 16) registered in the interface in FIG. 13, a button of "Same as basic information" 67 is pressed, whereby the basic information is transferred and repeated input can be avoided.

The changer register 46 also accepts the changer profile information 33 in an input section shown by the numeral 68 in this screen. This changer profile information 33 is information given to the inquirer 5 to confirm and specify the other party (the changer 3) about whose address the inquirer 5 wishes to inquire as described above.

Figure 15:
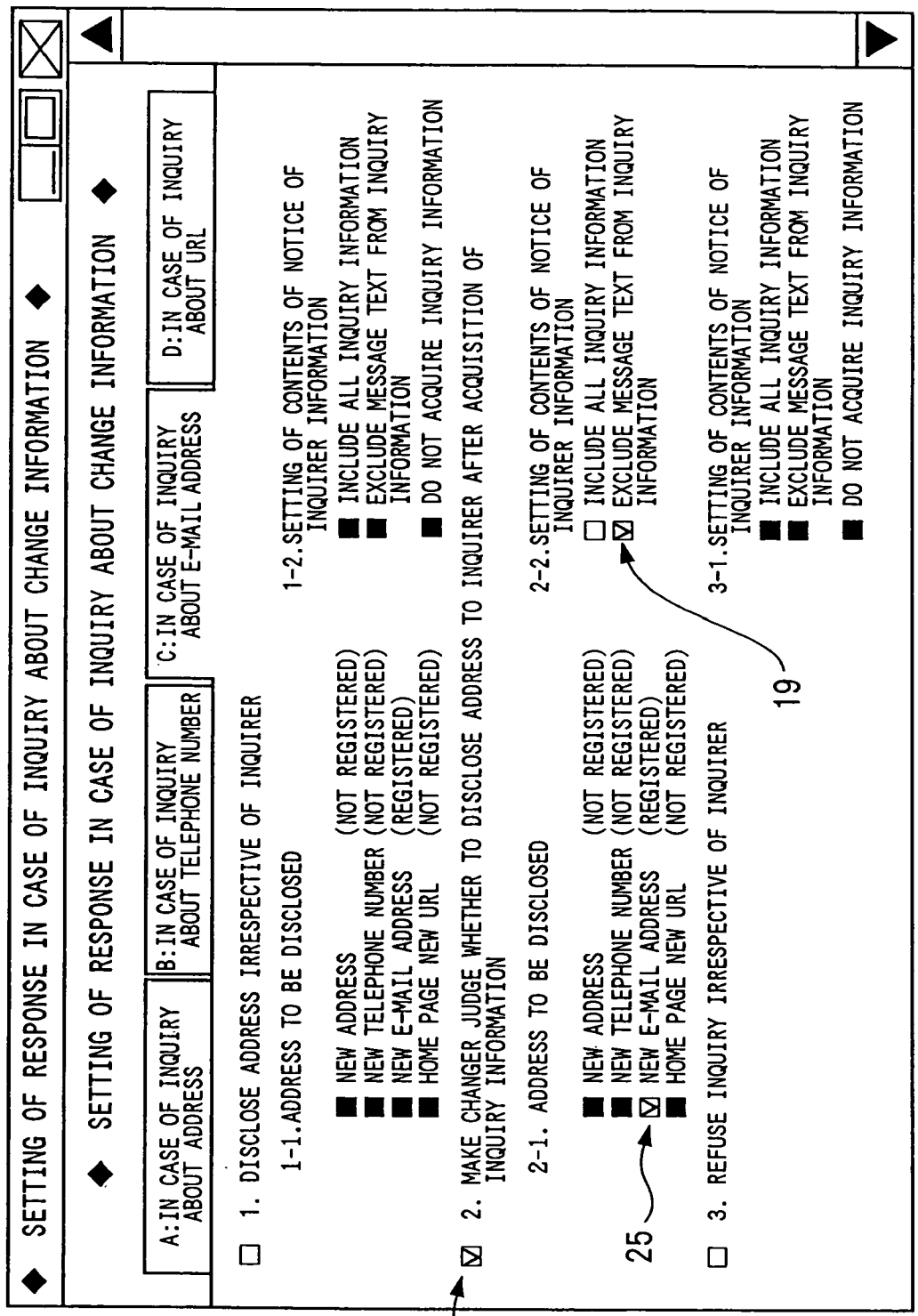
FIG. 15 shows an example of the interface screen for explaining the registration of the changer information.

Subsequently, the changer register 46 displays an interface screen shown in FIG. 15. This interface screen is to register and set the address disclosing condition 17, the disclosure rule 25, and the confirmation form format 19 from the information in the changer data base 10 shown in FIG. 9.

Namely, on this screen, the changer 3 registers the sort of the new address 24 to be disclosed to the inquirer 5 out of the registered new addresses 24 such as a new e-mail address and a new address, a condition of disclosure (including unconditional disclosure and unconditional non-disclosure) in the case where an inquiry is sent from the inquirer 5. The example in FIG. 8 shows the setting of the address disclosing condition 17, the disclosure rule 25, and the like when an inquiry with the presentation of an e-mail address as the old address 23 is sent.

In this example, "Make changer judge whether to disclose address to inquirer after acquisition of inquiry information (information about the inquirer 5)." (the pattern (2) shown by the numeral 29 in FIG. 9) is registered as the address disclosing condition 17, "New e-mail address" is registered as the sort of the new address 24 to be disclosed based on the e-mail address (the disclosure rule 25), and "Exclude message text (from the inquirer 5) from inquiry information (information about the inquirer 5)" is registered as the confirmation form format 19. The above information is registered in the changer data base 10 by the changer register 46.

Meanwhile, FIG. 16 is an example of a registration screen of the inquiry refusal list 18 (See FIG. 9).

On this screen, the changer 3 inputs conditions such as e-mail addresses of the inquirers from whom the changer 3 wishes to refuse inquiries. By pressing a "Registration" button 69 on this screen, these addresses are registered in the inquiry refusal list 18, and stored in the changer data base 10. Incidentally, this inquiry refusal list 18 can be renewed (added, deleted) at any time by the aforesaid process.

When the changer 3 finishes inputting changer information on each of the above screens, the changer register 46 displays a confirmation screen such as shown in FIG. 17. Incidentally, in order to confirm that the e-mail address registered by the changer 3 is owned by the changer himself or herself, it is suitable that the issued changer ID 21 is not displayed on this screen and that an e-mail notifying the completion of changer registration is separately transmitted from the address inquiry system 1 to the changer 3 to notify the changer ID 21 by this e-mail. Moreover, an e-mail in which the same contents are described may be transmitted to the changer 3 without displaying this confirmation screen (FIG. 17).

(Registration by Inquirer)

Figure 18:
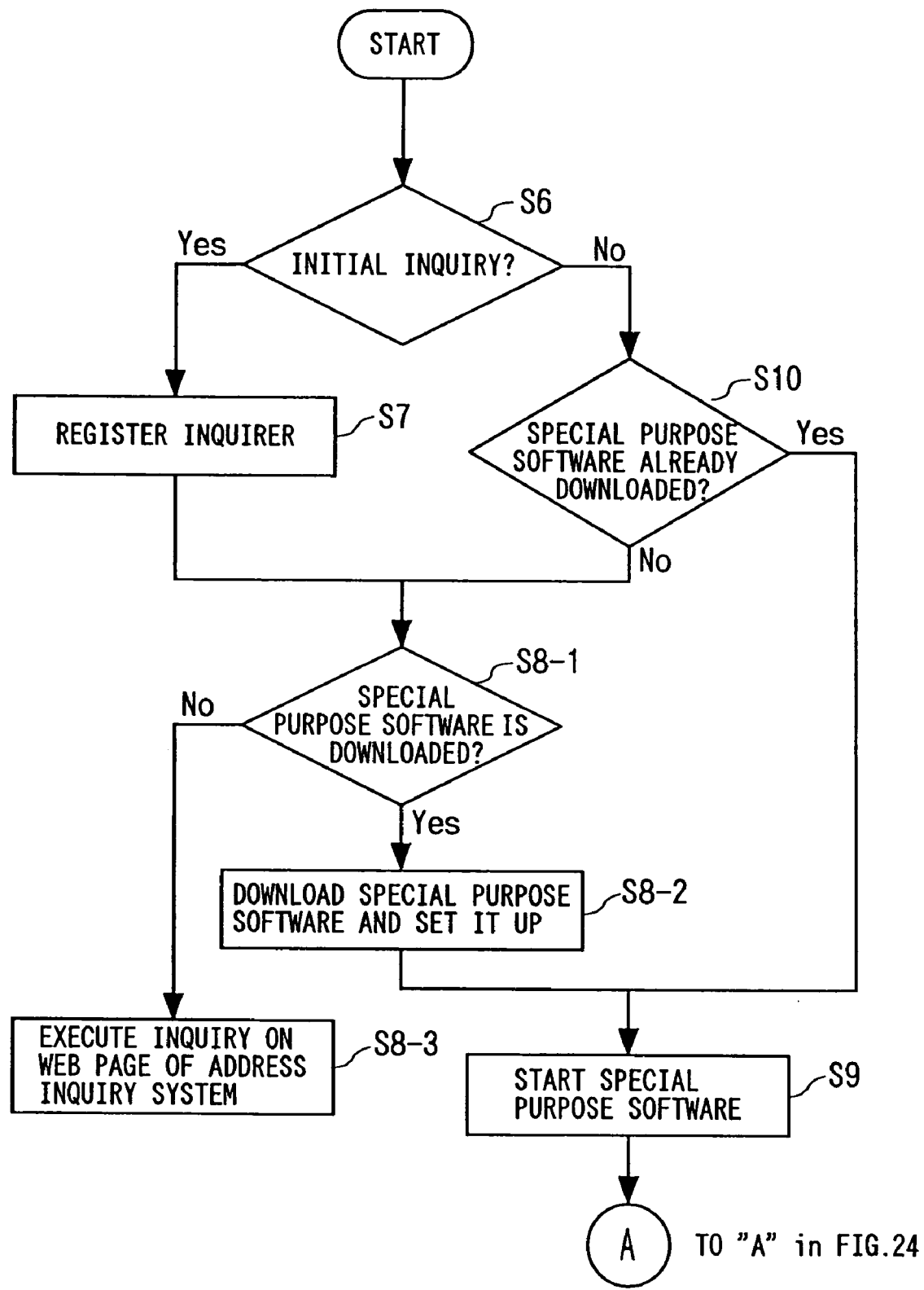
FIG. 18 is a first flowchart showing the process of registration of inquirer information and inquiry about a new address.

Next, the registration of inquirer information by the inquirer register 48 will be explained with reference to a flowchart shown in FIG. 18 and examples of an interface screen shown in FIG. 19 to FIG. 22. This registration of inquirer information is executed as a part of the process of an inquiry about the new address 24 from the inquirer 5.

Namely, the inquiry from this inquirer 5 is executed when the inquirer 5 cannot get access to the changer 3 when he or she sends an e-mail to the old address 23 without knowing the change thereof or tries to refer to a home page by an old URL address without knowing the change thereof.

The inquirer register 48 first judges whether an inquiry from the said inquirer 5 is his or her initial inquiry by inquiring of the inquirer data base 11 about it (step S6). When the inquirer 5 uses the address inquiry system 1 for the first time, that is, when the inquirer 5 inquires about an address for the first time, the inquirer register 48 accepts the registration of this inquirer 5 (step S7).

Figure 20:
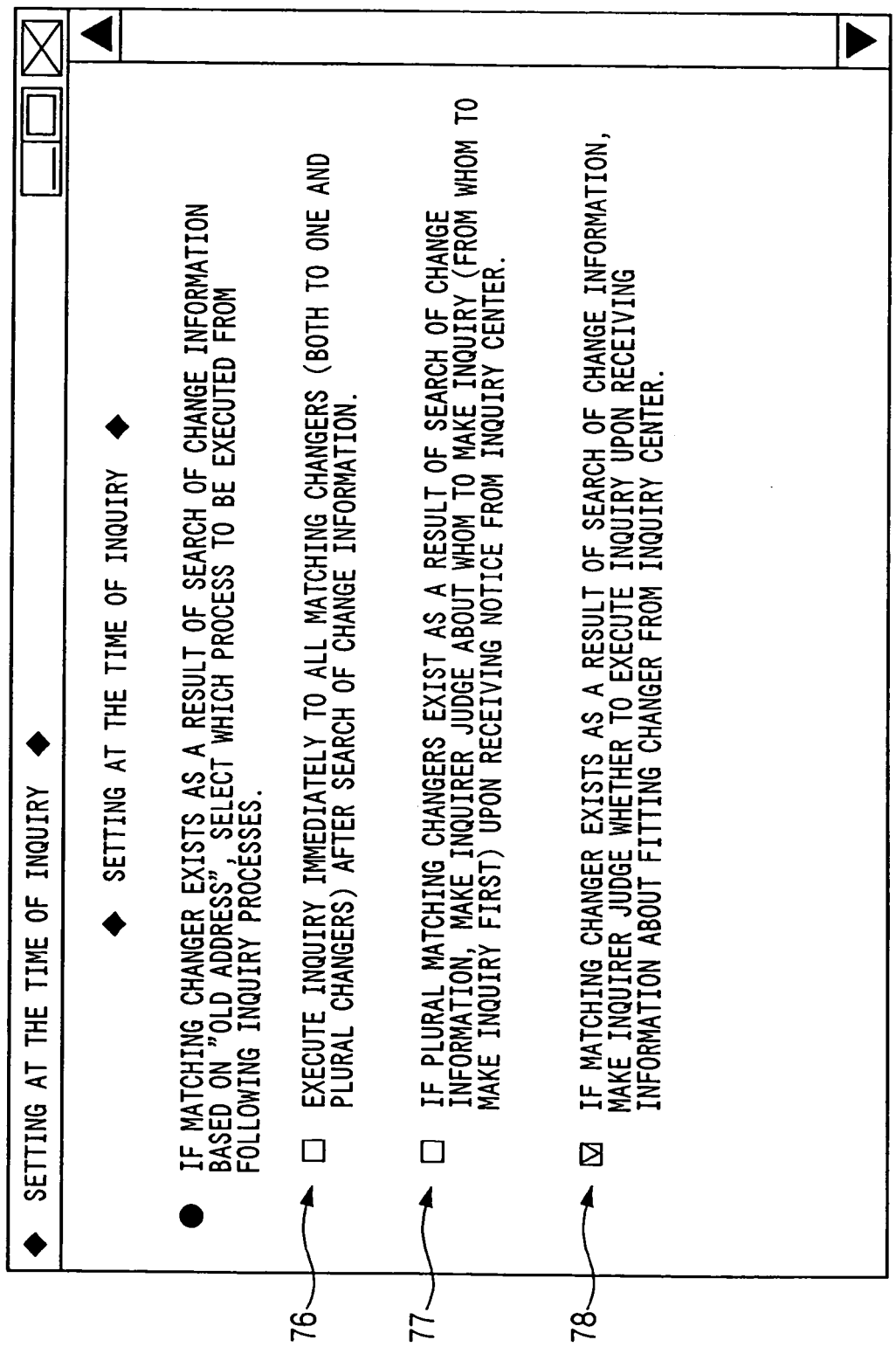
FIG. 20 shows an example of the interface screen for explaining the registration of the inquirer information.

FIG. 19 and FIG. 20 are examples of screens for accepting the registration of information about the inquirer 5.

FIG. 19 is an example of a screen in which the inquirer register 48 accepts the registration of attribute information of the inquirer 5, and the inquirer 5 registers basic information such as a name 70, an address 71, a telephone number 72, a FAX number 73 and sets and acquires the inquirer reference address 39 for receiving an inquiry result if he or she wishes. Incidentally, in registering the basic information about the inquirer 5, individual registration or corporate registration can be selected, and an example of the individual registration is shown here. The information inputted on this screen is registered as the inquirer attribute information 37 and the inquirer reference address 39 in the inquirer data base 11 (See FIG. 10).

Then, the changer selector 50 performs setting on receipt of a response to a search result on a screen shown in FIG. 20. Specifically, when the matching changers 3 are searched as a result of the search of the change information, it is selected that the inquiry is immediately made for (all) the matching changers 3 (a pattern shown by the numeral 76 in FIG. 20), that an inquiry is made after the selection of the changer 3 when a plurality of matching changers 3 are searched (a pattern shown by the numeral 77 in FIG. 20), or that the inquiry is made after a memo, a profile, or the like which characterizes the changer 3 is confirmed (a pattern shown by the numeral 78 in FIG. 20).

Figure 21:
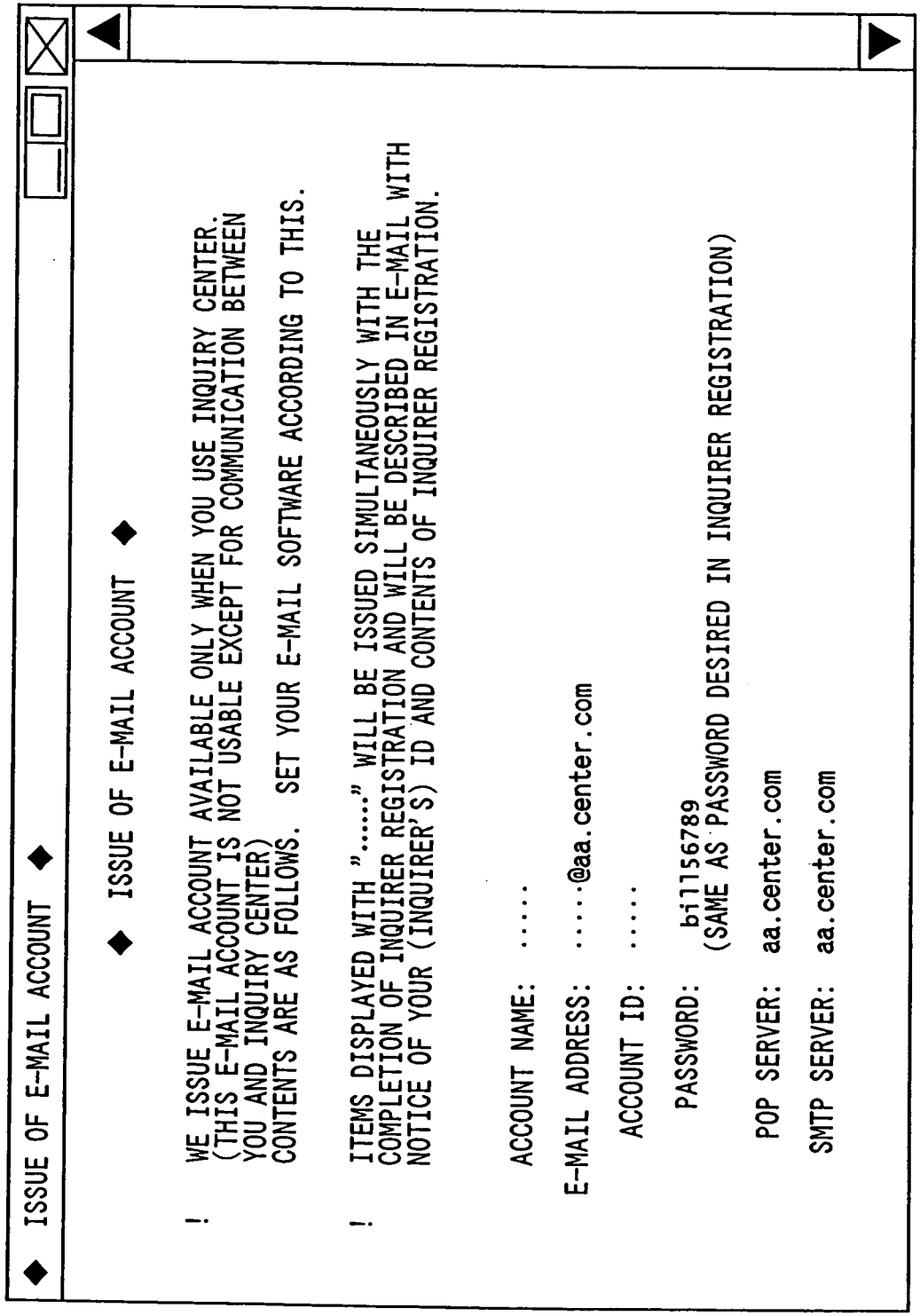
FIG. 21 shows an example of the interface screen for explaining the registration of the inquirer information.

Thereafter, the inquirer register 48 displays a screen shown in FIG. 21 for the inquirer 5 which has acquired the inquirer reference address 39 on the registration screen of inquirer information in FIG. 19, and notifies him or her of account information.

After the completion of the aforesaid registration operations, the inquirer register 48 displays a screen of the completion of inquirer registration shown in FIG. 22. This screen shows a list of information contents inputted or selected by the inquirer 5 in order that the inquirer 5 confirms registration contents. Incidentally, an e-mail in which the same contents are described may be sent to the inquirer 5.

Thereafter, the address inquiry system 1 makes the inquirer 5 judge whether to download special-purpose software for assisting the inquiry about the address (step S8-1). When this special-purpose software is downloaded, the download and set-up thereof is executed in step S8-2.

Namely, after this special-purpose software is downloaded in the computer system of the inquirer 5, an installer is automatically started, and this software is installed in the inquirer terminal 6 at the request of the inquirer 5 (step S8-2). This special-purpose software is automatically started by recognizing that e-mail is returned because its destination is unknown or that a URL address is not found as will be explained later (step S9), and has a function of assisting an access to the address inquiry system 1 and the search for the new address 24.

Even if the inquirer 5 is not a person who sends an inquiry to the address inquiry system 1 for the first time (No in step S6), the special-purpose software is downloaded when it has not been downloaded yet (step S10). When the special software is not downloaded in the aforesaid step S8-1, subsequent processes are executed on Web page provided by the address inquiry system 1 (step S8-3). The inquiry process on this Web page is almost the same as the undermentioned inquiry process by the use of the special-purpose software, and thus the explanation thereof is omitted.

(Inquiry by Inquirer)

Next, the process of an inquiry about the new address 24 by the use of the special-purpose software will be explained.

Figure 23:
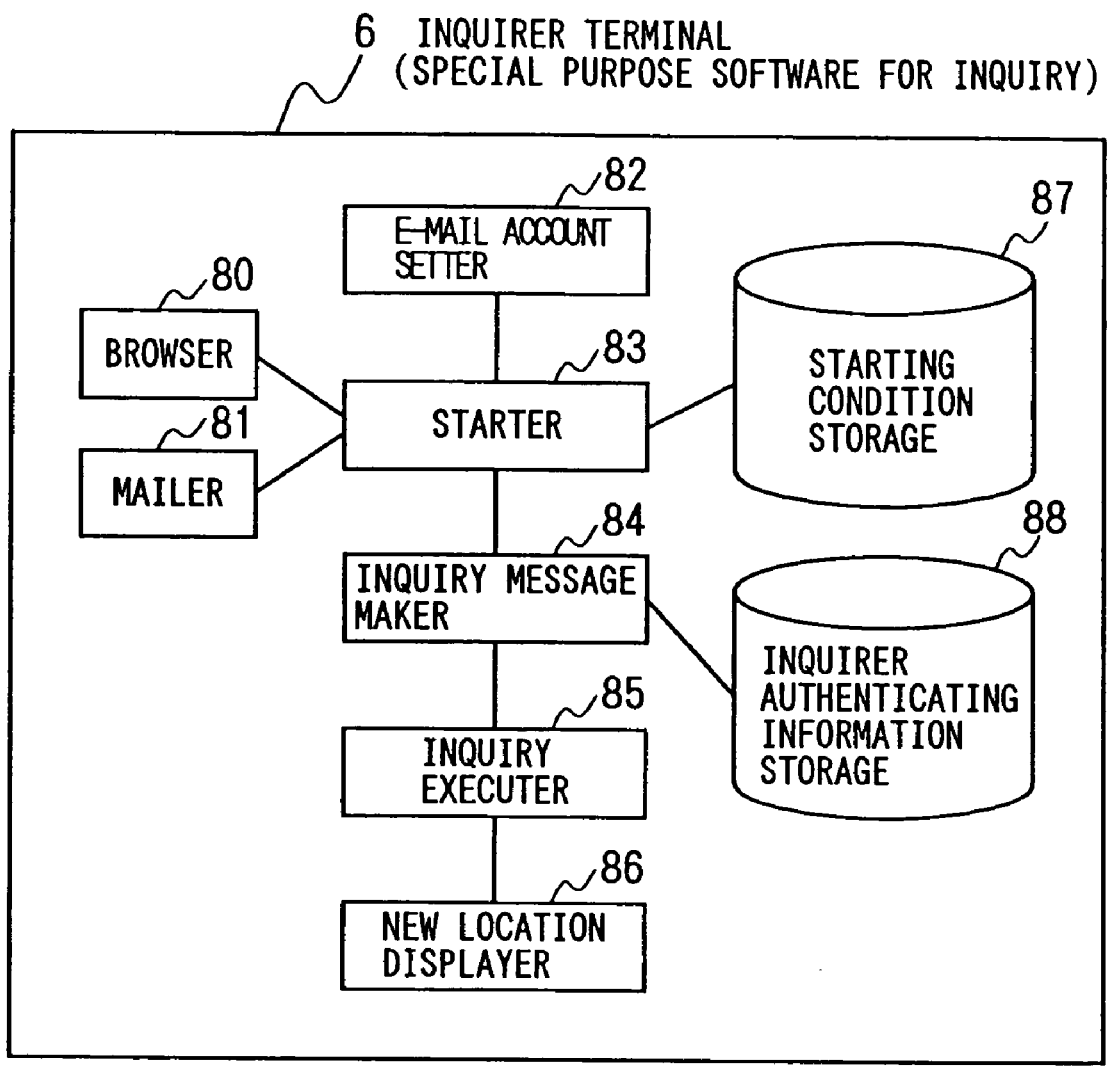
FIG. 23 is a block diagram showing the configuration of an inquirer terminal in which special-purpose software for inquiry is installed.

FIG. 23 is a schematic block diagram showing the inquirer terminal 6 in which the special-purpose software is installed in a storage medium such as a hard disk. FIG. 23 shows the configuration of only a software program related to the present invention, and the illustration of hardware such as a CPU and basic software such as an OS is omitted.

In the inquirer terminal 6 in which this software is installed, a browser 80 for browsing an Internet home page and a mailer 81 for transmitting and receiving e-mail are set up in advance. The aforesaid software has e-mail account setter 82 setting e-mail account of the inquirer reference address 39 in the mailer 81, a starter 83 starting this software based on the receipt of a notice that an address is unknown by the browser 80 and the mailer 81, an inquiry message maker 84 making out an inquiry message for the address inquiry system 1 based on information from the browser 80 and the mailer 81, an inquiry executor 85 logging in the address inquiry system 1 and registering the inquiry message, and a new location displayer 86 displaying a new location (for example, a home page) based on the acquisition of the new address 24 of the new location as the result of the inquiry.

The starter 83 and the inquiry message maker 84 operate based on starting conditions stored in a starting condition storage shown by the numeral 87 in FIG. 23. Namely, in the starting condition storage 87, starting conditions such that the browser 80 and the mailer 81 automatically starts this software based on the receipt of a notice that an access with presentation of the old address 23 is refused are stored depending on the sort of the browser 80 and the mailer 81 as described above.

Moreover, this software has an inquirer authenticating information storage 88 storing the inquirer authenticating information 35. The inquiry message maker 84 automatically takes in the inquirer authenticating information 35 from this inquirer authenticating information storage 88, and the inquiry executor 85 logs in the address inquiry system 1 by using the inquirer authenticating information 35.

Figure 24:
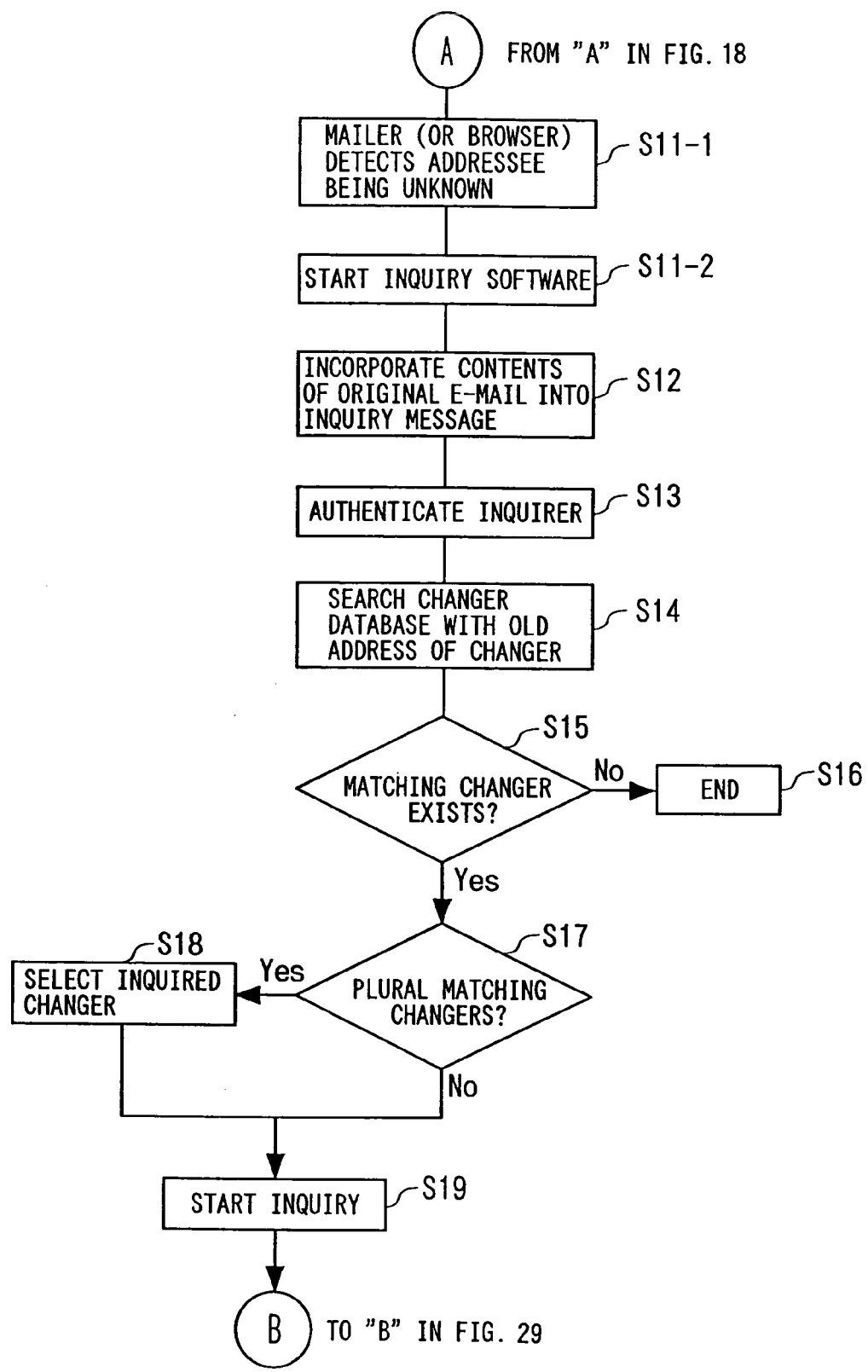
FIG. 24 is a second flowchart showing registration of inquirer information and the process of inquiry about the new address.

The inquiry process of the new address 24 will be explained below by means of flowcharts in FIG. 24 and FIG. 29 and interface screen examples in FIG. 25 and the following figures.

When the aforesaid special-purpose software is used, the starter 83 starts the inquiry message maker 84 based on the receipt of an e-mail of a non-delivery notice, in which a message that a destination is unknown is described, by the mailer 81 (steps S11-1 and S11-2 in FIG. 17). Incidentally, manual starting is also possible by changing starting conditions stored in the starting condition storage 87.

Figure 25:
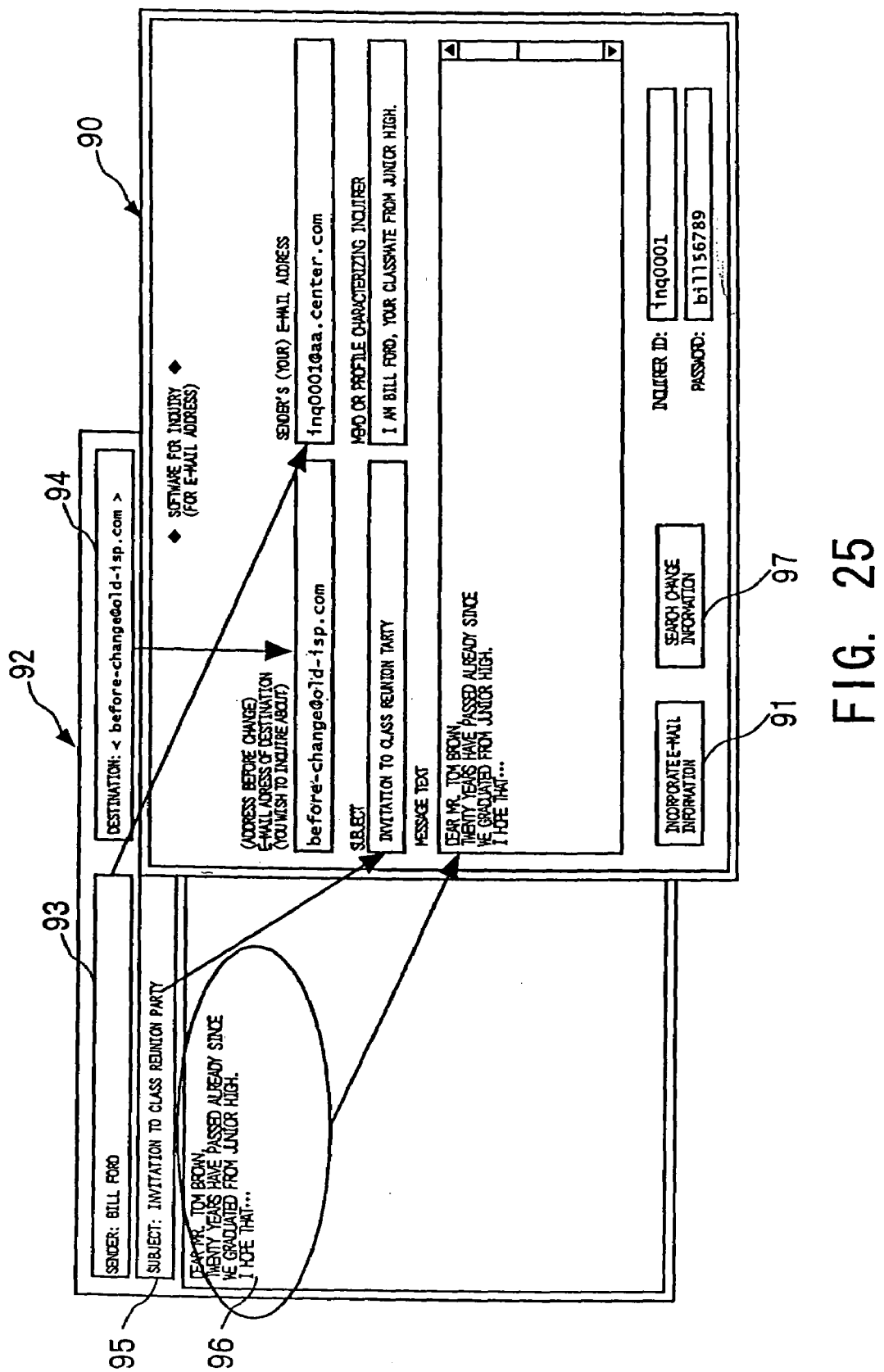
FIG. 25 shows an example of an interface screen for explaining the inquiry process in which the special-purpose software for inquiry is used.

FIG. 25 is a conceptual diagram showing operations at the time of the starting of inquiry software. The inquiry message maker 84 has functions of displaying an input screen for an inquiry message such as shown by the numeral 90 in FIG. 25 in the inquirer terminal 6 and transferring a sender 93, a destination 94, a subject 95, a message text 96, and the like out of the contents of original e-mail 92 attached to the non-delivery notice e-mail to the input screen in response to the click of a "Incorporate e-mail information" button 91 on this screen (step S12). It is possible to directly amend the inputted matters on this screen 90 when the inquirer 5 wants to supplement the information. Thus, the inquiry message to be sent to the address inquiry system 1 is made out.

If the making of the inquiry message is completed, the inquiry executor 85 is started by pressing a "Search change information" button 97 on the screen 90, and gets access to the address inquiry system 1, and logs in the system 1 using the inquirer authenticating information 35. Authentication on this occasion is executed by the inquirer authenticator 47 (See FIG. 11) of the system.

Figure 27:
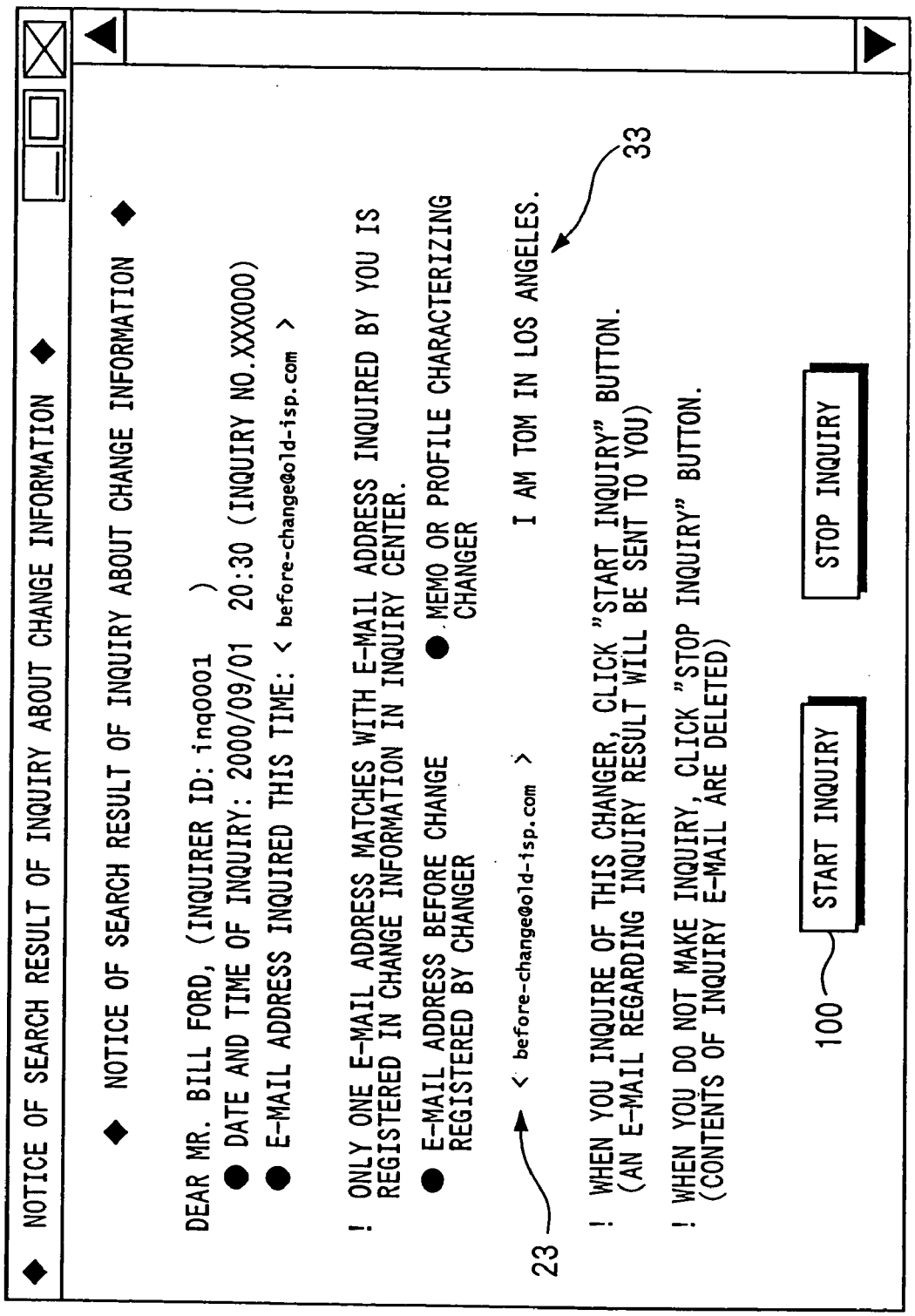
FIG. 27 shows an example of the interface screen for explaining the inquiry process in which the special-purpose software for inquiry is used.
Figure 28:
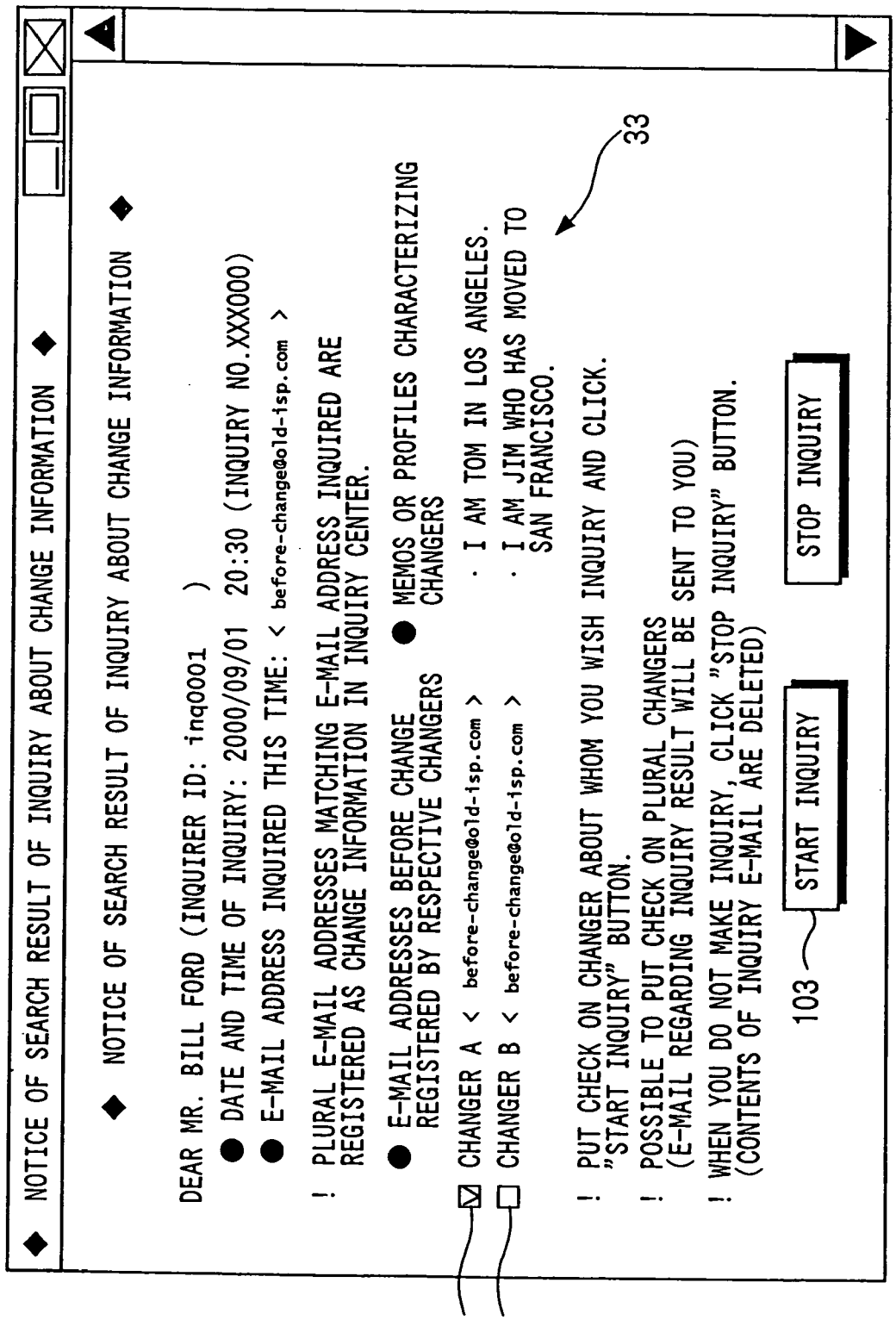
FIG. 28 shows an example of the interface screen for explaining the inquiry process in which the special-purpose software for inquiry is used.

When the authentication by the inquirer authenticator 47 is completed, the destination 94, that is, the old address 23 of the changer 3 out of the inquiry information is sent to the changer searcher 49. The changer searcher 49 searches the changer data base 10 by means of the received old address 23 (step S14). FIG. 26 to FIG. 28 show examples of interface screens for showing search results by the changer searcher 49 on the inquirer terminal 6.

FIG. 26 shows an example of a screen of a Web page for informing the inquirer 5 that as the result of a search of the changer data base 10 in the address inquiry system 1 for the old address 23 of the changer 3, the said address is not found (step S15). In this case, the inquiry about the corresponding new address 24 comes to an end at this stage (step S16).

Meanwhile, FIG. 27 shows an example of a screen of a Web page for informing the inquirer 5 that only one matching address is found as the result of the search of the change information 15. The changer searcher 49 displays the changer profile information 33 together with the old address 23 of the changer 3, whereby the inquirer 5 can judge whether the owner of this old address 23 is the changer 3 about whose new address 24 the inquirer 5 wishes to inquire. When he wishes an inquiry, a "Start inquiry" button 100 is pressed (steps S17 and S19).

FIG. 28 shows an example of a screen of a Web page of the address inquiry system 1 informing the inquirer 5 that a plurality of matching addresses are found as the result of the search of the change information 15. In this case, the inquirer 5 can select the changer 3 about whose new address 24 the inquirer 5 wishes to inquire with reference to the changer profile information 33 (the changer attribute information 16) of the changer 3. By pressing a "Start inquiry" button 103 after the selection of the changer 3 by the use of check boxes 101 and 102, an inquiry about the new address 24 of the changer 3 can be started (step S17 to S19).

Incidentally, the communication between the changer 3 and the inquirer 5, and the address inquiry system 1 can be performed by e-mail, in which case it is possible to use the changer reference address 20 and the inquirer reference address 39 which are assigned by the address inquiry system 1.

Figure 29:
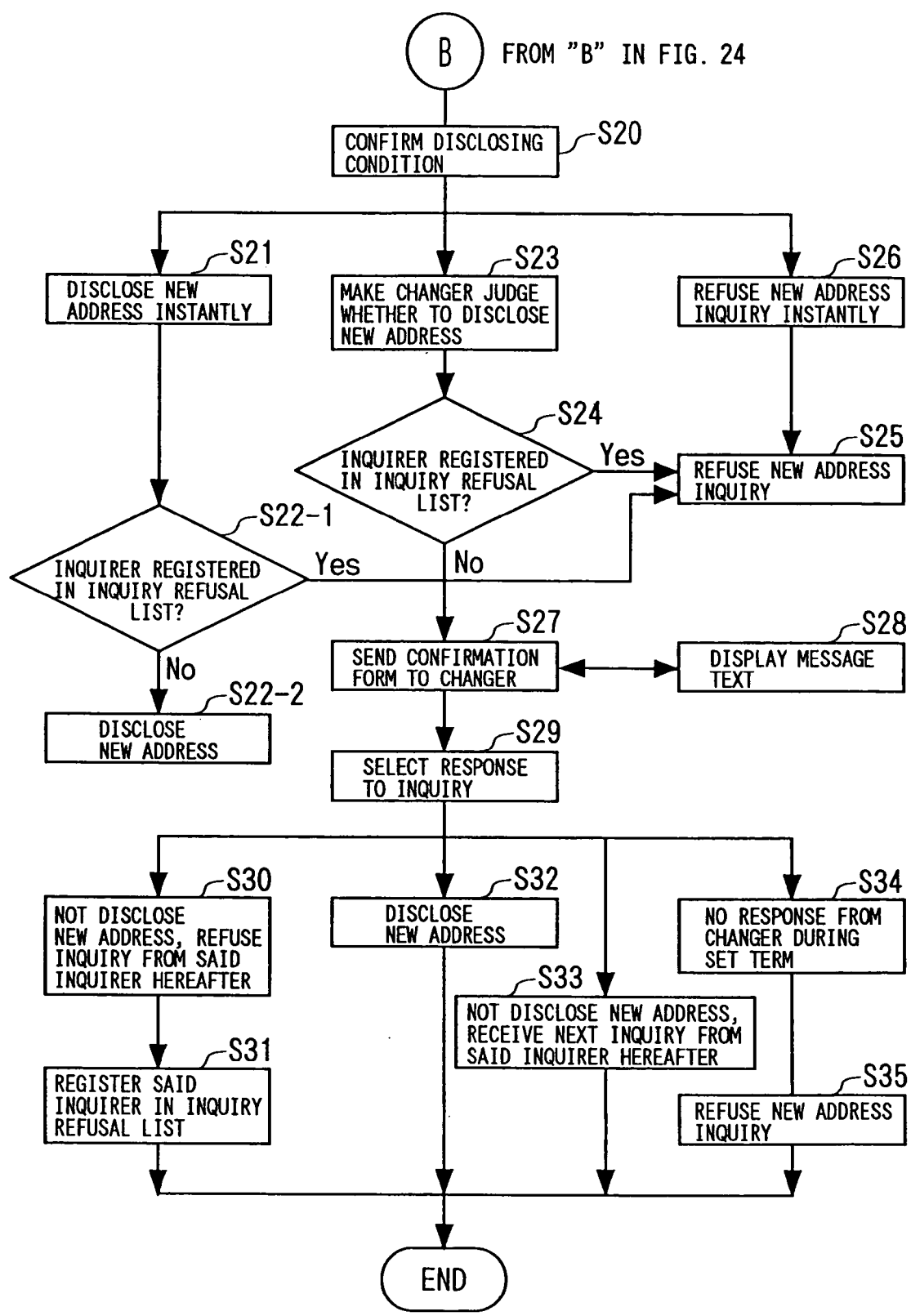
FIG. 29 is a third flowchart showing the process of registration of inquirer information and inquiry about the new address.

Based on the press of the "Start inquiry" buttons 100 and 103 by the inquirer 5, the new address disclosure judge 51 takes the address disclosing condition 17 out of the changer data base 10 and confirms which pattern out of the numerals 28 to 30 shown in FIG. 9 the address disclosing condition 17 of the changer 3 imposed on the inquiry about the new address 24 is (step S20 in FIG. 29).

When the address disclosing condition 17 is "Disclose new address instantly" (the numeral 28 in FIG. 9), the inquiry refusal list 18 is then checked in this embodiment, and only when the inquirers 5 are not registered in the inquiry refusal list 18, the new address 24 is disclosed unconditionally to all the inquirers 5 (steps S21, S22-1, and S22-2). In this case, the address disclosure judge 51 and the discloser 54 in the address inquiry system 1 display a screen shown in FIG. 26 in the inquirer terminal 6 and disclose the new address 24 of the changer 3 to the inquirer 5. In this example, only an e-mail address is disclosed as the new address 24, but other sorts of new addresses 24, that is, a URL address, an address, a telephone number, and the like can be displayed according to the disclosure rule 25.

When the address disclosing condition 17 registered by the changer 3 is "Make changer judge whether to disclose new address without disclosing new address instantly" (the numeral 29 in FIG. 9), the inquiry refusal list 18 is then checked in this embodiment, and only when the inquirer 5 is not registered in the inquiry refusal list 18, the process advances to the next step (steps S23 and S24).

Figure 34:
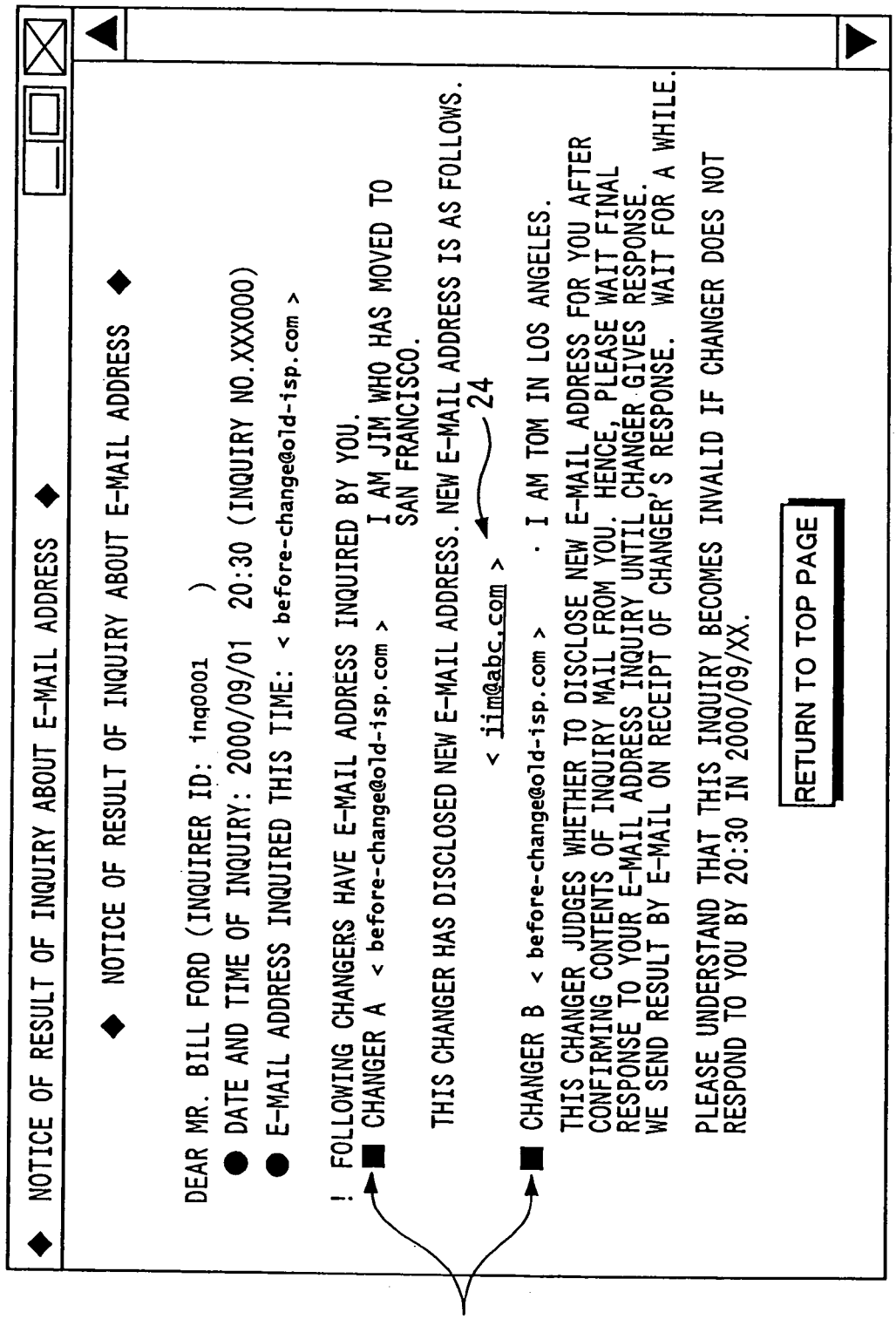
FIG. 34 shows an example of the interface screen for explaining the inquiry operation by the address inquiry system.

FIG. 34 shows an example of a notice screen in the inquirer terminal 6 by the new address disclosure judge 51 and the discloser 54 when the inquirer 5 is not registered in the inquiry refusal list 18. This example shows a notice of the inquiry result when the plural changers 3 (a changer A and a changer B) are selected on the screen shown in FIG. 28, and the new address 24 regarding the changer A is disclosed by the pattern shown by the numeral 28 in FIG. 9. Meanwhile, regarding the changer B, the inquirer 5 is informed that the changer 3 judges whether to disclose the new address 24 according to the pattern shown by the numeral 29 in FIG. 9.

Incidentally, even when this pattern is selected, if the inquirer 5 is registered in the inquiry refusal list 18, his or her inquiry is refused (step S25). In this case, the screen shown in FIG. 32 is displayed in the inquirer terminal 6.

Further, when the address disclosing condition 17 registered by the changer 3 is "Refuse inquiry about new address instantly" (the numeral 30 in FIG. 9), inquiries from all the inquirers 5 are refused unconditionally in this embodiment (steps S26 and S25). Also in this case, the same screen shown in FIG. 32 is displayed in the inquirer terminal 6.

Next, the process of the confirmation of the changer 3 in step S27 and the following steps will be explained.

Figure 30:
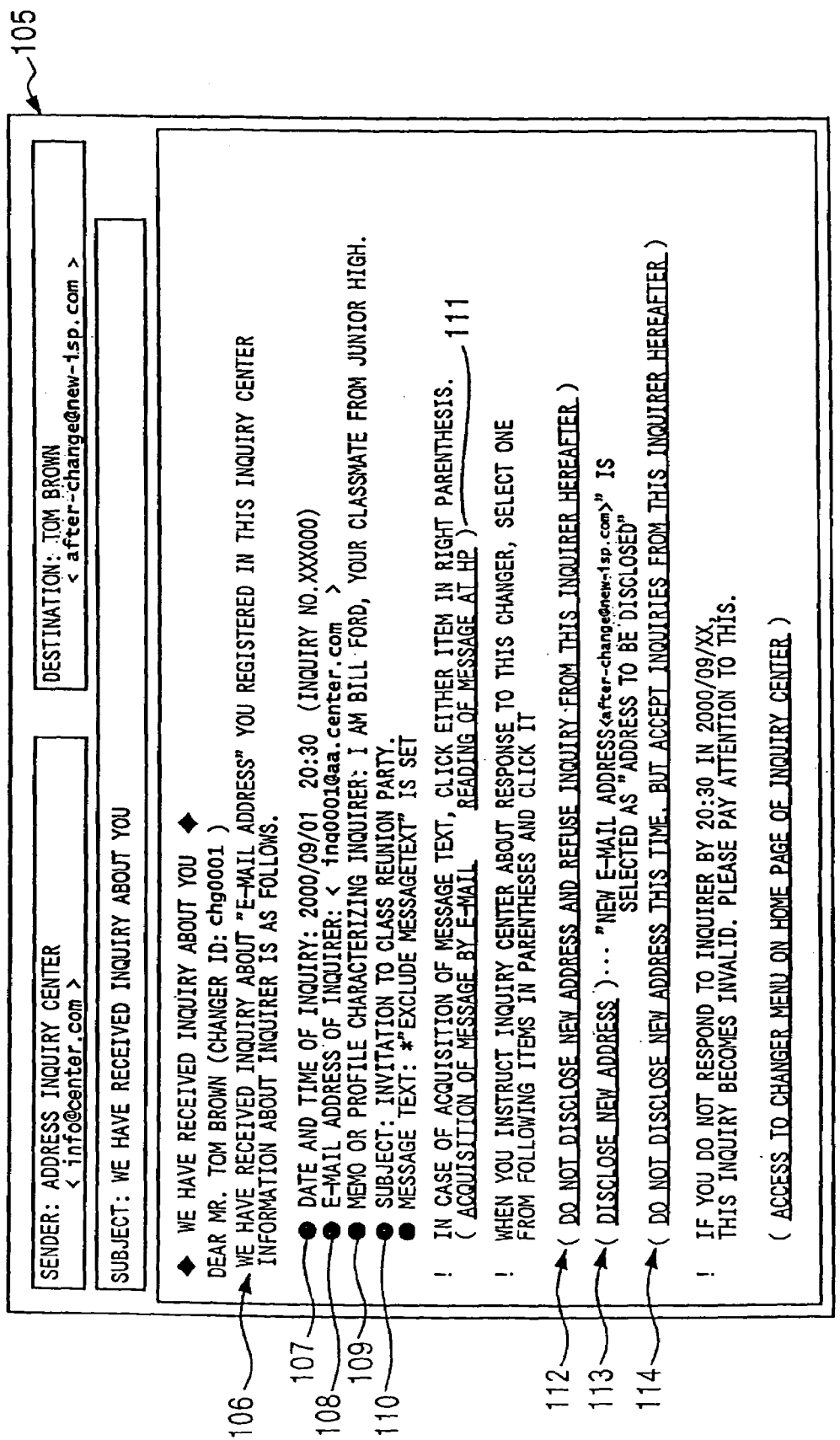
FIG. 30 shows an example of an interface screen for explaining an inquiry operation by an address inquiry system.

In this case, the new address disclosure judge 51 sends an e-mail of a confirmation form 105 with contents shown in FIG. 30 to the changer 3 to confirm whether the new address 24 is disclosed or not (step S27 in FIG. 29). In the confirmation form 105, a notice 106 that an inquiry about the new address 24 is sent, a date and time of the inquiry 107, an address 108 of the inquirer 5, a profile 109 of the inquirer 5, and a subject 110 are displayed. When "without message text" (the pattern shown by 32 in FIG. 9) is set in the confirmation form format 19, the message text in the inquiry message 90 shown in FIG. 25 received from the inquirer 5 is not displayed as described above. However, by selecting a link 111 for obtaining and displaying the message text, an e-mail in which the message text is described can be received as shown in FIG. 31 (step S28).

Meanwhile, in the confirmation form 105, as shown in FIG. 30, the changer 3 who receives it can select a response to this inquiry among hyperlinks shown by the numeral 112 to 114 in FIG. 30, that is, in this embodiment, can select a response from "Do not disclose new address, and refuse inquiry from this inquirer hereafter" (the hyperlink shown by the numeral 112 in FIG. 30), "Disclose new address" (the hyperlink shown by the numeral 113 in FIG. 30), or "Do not disclose new address this time, but receive inquiries from this inquirer hereafter" (the hyperlink shown by the numeral 114 in FIG. 30).

FIG. 38 is an example of a notice to the inquirer 5 when "Do not disclose new address, and refuse inquiry from this inquirer hereafter" (the hyperlink shown by the numeral 112 in FIG. 30) is selected. In this case, the inquirer 5 is registered to the inquiry refusal list 18, and hereafter inquiries from the said inquirer 5 are automatically refused until the changer 3 changes the setting (steps S30 and S31).

Figure 39:
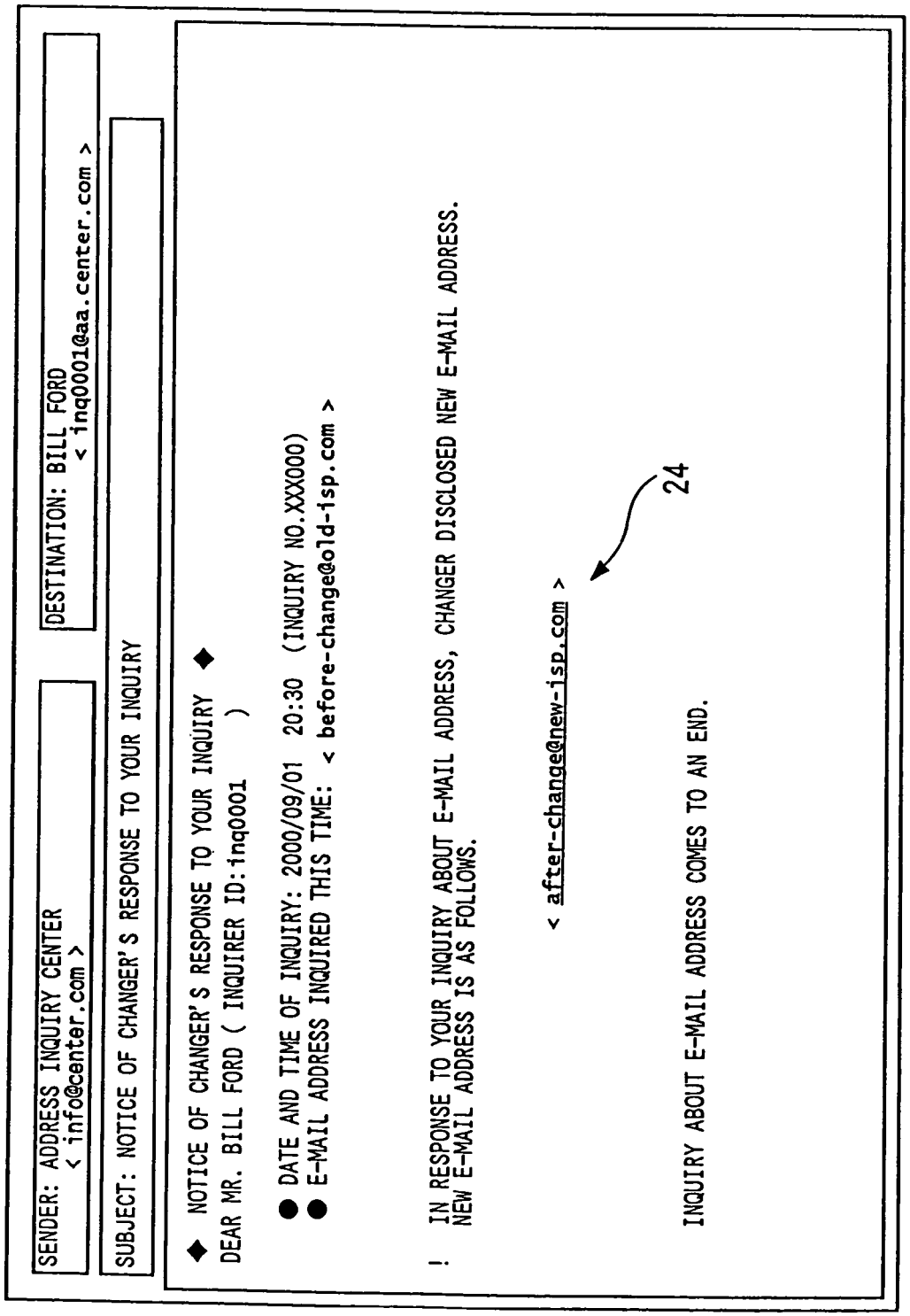
FIG. 39 shows an example of the interface screen for explaining the inquiry operation by the address inquiry system.

FIG. 39 is an example of a notice to the inquirer 5 when "Disclose new address" (the hyperlink shown by the numeral 113 in FIG. 30) is selected (step S32). Via this screen, the inquirer 5 can know the new address 24 of the changer 3 and get access to the said changer 3 by e-mail or the like.

FIG. 35 shows an example of the contents of an e-mail received when the changer 3 selects "Do not disclose new address this time, but receive inquiries from this inquirer hereafter" (the hyperlink shown by the numeral 114 in FIG. 30) in the confirmation form 105 shown in FIG. 30. In this example, the changer 3 refuses an inquiry about the new address 24 from the inquirer 5 but does not register this inquirer in the inquiry refusal list 18, and thereby a notice that the similar inquiries can be made hereafter is given (step S33). Moreover, when the changer 3 selects nothing within a predetermined period, an e-mail shown in FIG. 36 is transmitted, the inquiry is refused, and the processing is completed (steps S34 and S35).

Incidentally, the display screens in FIGS. 35, 36, 38, and 39 show examples in the case where the changer 3 who discloses the new address is singular. When an inquiry is made about a plurality of changers 3 at the same time, a list of results of responses to the permission of disclosure of new addresses of the plurality of changers 3 may be displayed all at once by the same screens. Further, the display screens in FIGS. 35, 36, 38, and 39 are notice screens when a notice from the address inquiry system 1 is received by e-mail. Meanwhile, the inquirer 5 can confirm this notice through a Web page by being authenticated by the address inquiry system 1 and logging therein.

A notice of the inquiry result to the inquirer 5 is executed by the discloser 54, and the monitoring of the aforesaid predetermined period is executed by the inquiry process monitor 53. If the new address 24 obtained as the result of the inquiry is a home page address, the new location displayer 86 operates to make the browser 80 display a home page of the new location automatically.

According to the configuration explained above, the following effects can be obtained.

(1) In most of conventional services, the inquirer 5 is informed about the new address of the changer 3 unconditionally if the inquirer 5 inquires about the old address 23 and the said old address is registered. Namely, in such services, it is impossible to selectively inform the inquirers 5 about the new address 24 depending on the inquirers 5.

Contrary to this, according to the aforesaid embodiment, the changer 3 can freely set the address disclosing condition 17 of the new address 24 and judge whether to disclose the new address 24 after checking the profile of the inquirer 5, thereby producing an effect that flexible responses to meet the situation of the changer 3 can be made with regard to the disclosure of the new address 24.

(2) In conventional services, the changer 3 side cannot know when or to whom the new address 24 is disclosed.

Contrary to this, according to the aforesaid embodiment, the changer 3 can receive a confirmation form to confirm whether the new address 24 is disclosed to the inquirer 5, and the changer 3 can determine when and to whom the new address 24 is disclosed by controlling his or her response to the confirmation form.

(3) Conventionally, to notify a third party of the change information 15 of a URL of a home page, it is necessary to notify him or her of a URL (the new address 24) of a new home page on the old home page. Therefore, a domain name of the old home page and a contract with an Internet service provider need to be maintained, which causes a problem that the cost thereof needs to be borne during the notification of the change information 15.

Contrary to this, according to the aforesaid embodiment, the address inquiry system 1 can provide an inquiry about the URL (the new address 24) of the new home page, so that a domain server of the old home page or the contract with the Internet service provider does not need to be maintained. Thus, to the changer 3, server administration becomes easier, and the cost of maintaining servers can be reduced.

(4) When the change information 15 about a telephone number or a mail address is given, there is a limit in terms of a period to the present service of a telephone office or a post office.

Contrary to this, according to the aforesaid embodiment, the new address 24 can be disclosed regardless of the service of the telephone office or the post office.

(5) In the case of mail service, the receiver needs to inform a sender of mail delivered to the old address about the new address on another occasion by himself or herself as described above.

Contrary to this, according to the aforesaid embodiment, the system can respond to an inquiry about a new mail address (the new address 24) in place of the receiver of the mail, thereby eliminating such a trouble.

(6) Meanwhile, in transport by the majority of private companies, it is impracticable to make a forwarding request to all of transport companies, and moreover, some private companies do not accept such a request.

Contrary to this, if the address inquiry system 1 is used, a private transporter can be used after the new address 24 of the changer 3 is known, which makes it possible to ensure the delivery of a load and the like by such transporter.

(7) Addresses sometimes cease to be used for some reason. Namely, the use of the addresses themselves is sometimes stopped without the telephone number being changed. In this case, since the conventional service handles only addresses of the same sort, some who know only the telephone number cannot know other addresses of the changer 3.

Contrary to this, according to this embodiment, by setting the disclosure rule 25, inquiries about the new addresses 24 of different sorts can be made, for example, a new telephone number (the new address 24) is detected based on the e-mail address (the old address 23), whereby the aforesaid trouble is eliminated.

It should be mentioned that the present invention is not limited to the aforesaid embodiment, and various changes may be made therein without changing the spirit of the present invention.

For example, it is already described that processing can be executed by the same process as above also in the case of an inquiry about a new home page URL as the new address 24. The home page, however, aims at being opened to the public, and hence the permission of disclosure of a URL at a new location is often given unconditionally. In this case, it is imagined that it is troublesome to follow the same steps as that of the e-mail address, which is sometimes unbecoming for the purpose of the home page.

To cope with this, in the aforesaid special-purpose software, based on the detection of "An access destination is unknown" by the browser 80, the inquiry message maker 84 and the inquiry executor 85 may automatically make out an inquiry message and transmit it to the address inquiry system 1 without obtaining confirmation from the inquirer 5.

If the changer searcher 49 finds the new address 24 (new location URL), the discloser 54 or the new location displayer 86 may give a command to the inquirer terminal 6 to display a Web page concerned in the new address 24.

Figure 37:
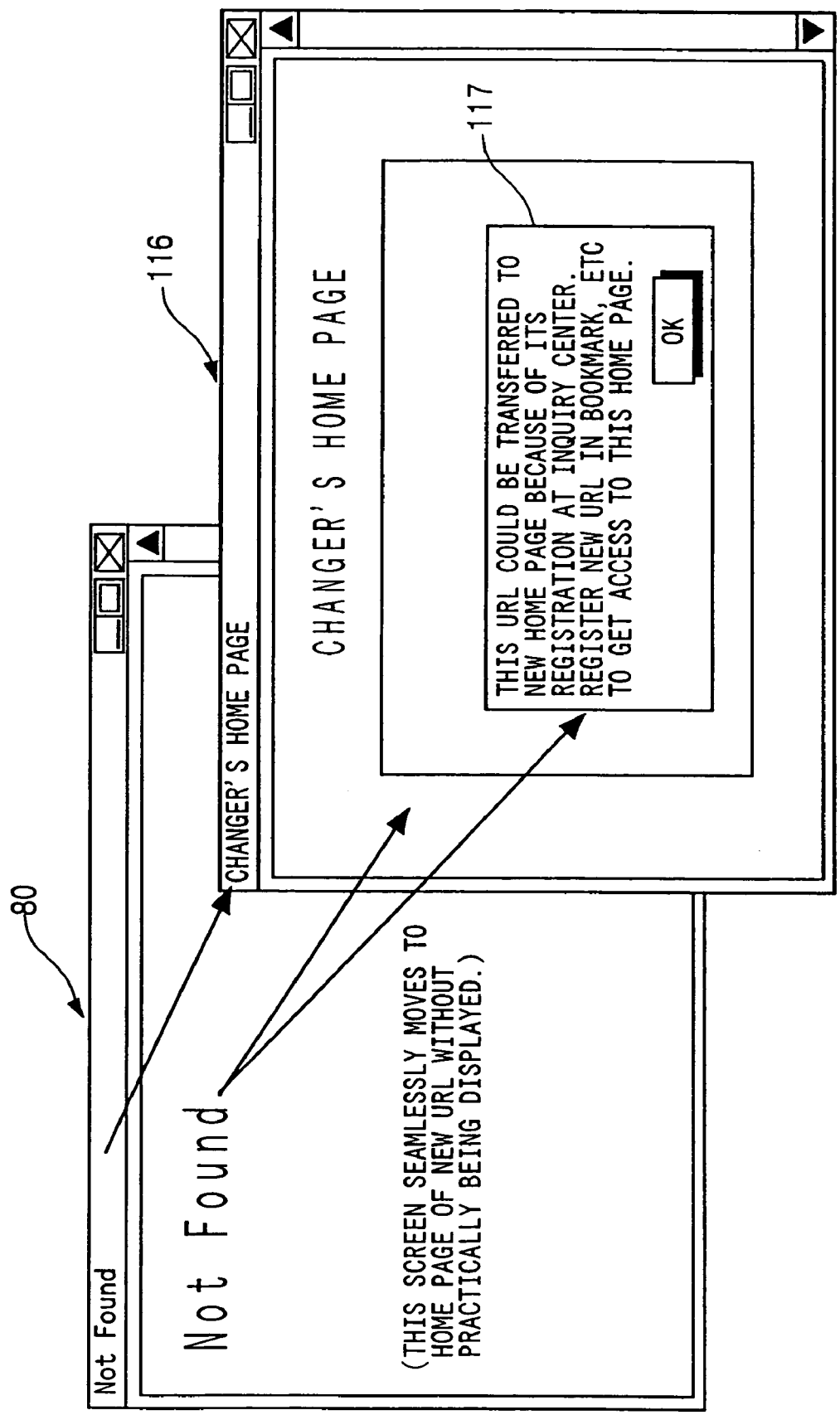
FIG. 37 shows an example of an interface screen for explaining another embodiment of the present invention.

Such a configuration enables the automatic display of a new home page 116 at the new location in the inquirer terminal 6 based on the detection of "An access destination to a desired home page is unknown" by the browser 80 as shown in FIG. 37. In this case, it is preferable to display also a screen 117 for persuading the inquirer 5 to renew the access destination in order to call the attention of the inquirer 5. Further, it is more preferable to display the new home page 116 at the new location without displaying an error display screen of "An access destination is unknown" by the browser 80.

Furthermore, in the aforesaid embodiment, the confirmation form (the screen shown by the numeral 105 in FIG. 30) from the address inquiry system 1 to the changer 3 is sent only when the response pattern (2) is selected (step S23) as shown in step S27 in FIG. 29, but the present invention is not limited to this.

For example, even when the response pattern (1) or (3) is selected (step S21 or S26), it is possible to send the changer 3 this form as an general notice in which information such that about which address, from what sort of the inquirer 5, and on what sort of matter an address inquiry is received is described when the inquiry about the new address 24 is received from the inquirer 5. Moreover, it is possible to include a message text to the changer in this notice.

In this case, however, it is preferable that only in the notice when the response pattern (2) is selected, the hyperlinks (the hyperlinks shown by the numeral 112 to 114 in FIG. 30) for confirming whether to disclosed the new address to the inquirer exist and that a response to the permission of disclosure of the new address is given with reference to the information about the inquirer 5 displayed in this notice.

Moreover, in the aforesaid embodiment, a registrant is explained with the changer 3 who has changed his or her own address from the old address 23 to the new address 24 as an example, but the registrant in the present invention is not limited to the changer 3 like this. For example, the registrant may be one who registers his or her own e-mail address or the like only to disclose it to others (the inquirer 5). Furthermore, based on the old address 23 of the changer 3, the new address 24 thereof is searched and disclosed in the aforesaid embodiment, but the present invention is not limited to this. The new address 24 may be searched by using information except the old address 23, for example, some attribute information of the changer 3.

INDUSTRIAL APPLICABILITY

As explained above, according to the present invention, it is possible to surely inform his/her telephone number to a person who he/she desires to inform surely without requiring time and labor in the directory assistance service.

The invention claimed is:

1. A method for informing a telephone number of a registrant to an inquirer, comprising:
    accepting a request for a telephone number of the registrant from the inquirer;
    judging whether the registrant is registered in a telephone number data base;
    judging whether an information from the inquirer is transmitted to the registrant at least without informing the telephone number of the registrant to the inquirer, corresponding to a disclosing condition registered in the data base when the registrant is registered in the telephone number data base; and
    causing the inquirer to input information and the registrant to be capable of being informed of the input information without directly connecting the inquirer to the registrant when the information from the inquirer is transmitted to the registrant.

2. The method according to claim 1,
    wherein the method includes requesting the inquirer for a message as the information, recording the message and causing the recorded message to be capable of being played back to the registrant.

3. The method according to claim 2,
    wherein the method includes calling the registrant and notifying the recorded message to the registrant when a terminal of the registrant is a conventional telephone set.

4. The method according to claim 2,
    wherein the method includes notifying the registrant that the message is recorded and causing the registrant to access the recorded message when a terminal of the registrant is a cellular phone.

5. The method according to claim 1,
    wherein the method includes requesting the inquirer for a message in a form of a character signal inputted by a push button operation as the information and informing the inputted message to the registrant.

6. The method according to claim 5,
    wherein the inputted message is converted to an audible sound and informing the registrant of the audible sound.

7. The method according to claim 1,
    wherein the method includes requesting the inquirer to transmit an e-mail as the information and causing the registrant to receive the transmitted e-mail.

8. The method according to any one of claims 1 to 7,
    being capable of setting one of a first condition and a second condition for each of the registrants, the first condition always informing the telephone number, the second condition always refusing to inform the telephone number in response to the request for the telephone number from the inquirer, as the disclosing condition registered in the data base.

9. The method according to any one of claims 1 to 7,
    wherein the request for the telephone number of the registrant is accepted by accessing an old telephone number of the registrant.

10. A system informing a telephone number of a registrant to an inquirer, comprising:
    a data base in which at least a telephone number of a registrant and a disclosing condition on whether an information from the inquirer is transmitted to the registrant without informing the telephone number to the inquirer, are corresponding to each other; and
    means for informing the information from the inquirer to a terminal of the registrant without directly connecting the inquirer to the registrant.

11. The system according to claim 10,
    wherein the informing means records a message as the information from the inquirer, and cause the recorded message to be capable of being played back to the registrant.

12. The system according to claim 11,
    wherein the terminal of the registrant is a conventional telephone set, and
    wherein the informing means calls the registrant and notify the recorded message to the registrant.

13. The system according to claim 11,
    wherein the terminal of the registrant is a cellular phone, and
    wherein the informing means notifies the registrant that the message is recorded and cause the registrant to access for playback of the recorded message from the cellular phone.

14. The system according to claim 10,
    wherein the informing means informs the registrant of a message in a form of a character signal inputted by a push button operation as the information from the inquirer.

15. The system according to claim 14,
    wherein the inputted message is converted to an audible sound and the audible sound is informed to the registrant.

16. The system according to claim 10,
    the informing means informs the registrant of a message in a form of an e-mail as the information from the inquirer.

17. The system according to any one of claims 10 to 16,
    wherein the system is capable of setting one of a first condition and a second condition for each of the registrants, the first condition always informing the telephone number, the second condition always refusing to inform the telephone number in response to the request for the telephone number from the inquirer, as the disclosing condition registered in the data base.

18. The system according to any one of claims 10 to 16, wherein the telephone number of the registrant and the telephone number of the inquirer are corresponds to each other in the data base, and the system further comprising:

means for accepting a request for a telephone number of the registrant from the inquirer;

means for judging whether the registrant is registered in the telephone number data base;

means for judging whether the information from the inquirer is transmitted to the registrant at least without informing the telephone number of the registrant to the inquirer, corresponding to a disclosing condition registered in the data base when the registrant is registered in the telephone number data base;

means for causing the inquirer to input information and the registrant to be capable of being informed of the inputted information when informing the telephone number of the registrant.

19. The method according to claim 8, wherein the request for the telephone number of the registrant is accepted by accessing an old telephone number of the registrant.

20. The system according to claim 17, wherein the telephone number of the registrant and the telephone number of the inquirer are corresponds to each other in the data base, and the system further comprising:

means for accepting a request for a telephone number of the registrant from the inquirer;

means for judging whether the registrant is registered in the telephone number data base;

means for judging whether the information from the inquirer is transmitted to the registrant at least without informing the telephone number of the registrant to the inquirer, corresponding to a disclosing condition registered in the data base when the registrant is registered in the telephone number data base;

means for causing the inquirer to input information and the registrant to be capable of being informed of the inputted information when informing the telephone number of the registrant.

* * * * *